US012566246B2

(12) United States Patent
Nashimoto

(10) Patent No.: US 12,566,246 B2
(45) Date of Patent: Mar. 3, 2026

(54) SIGNAL PROCESSING DEVICE, RADAR DEVICE, AND RADAR OPERATION METHOD

(71) Applicant: Mitsubishi Electric Corporation, Tokyo (JP)

(72) Inventor: Shoei Nashimoto, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 529 days.

(21) Appl. No.: 18/137,136

(22) Filed: Apr. 20, 2023

(65) Prior Publication Data

US 2023/0258767 A1 Aug. 17, 2023

Related U.S. Application Data

(63) Continuation of application No. PCT/JP2020/046141, filed on Dec. 10, 2020.

(51) Int. Cl.
| | |
|---|---|
| *G01S 7/36* | (2006.01) |
| *G01S 7/35* | (2006.01) |
| *G01S 13/58* | (2006.01) |

(52) U.S. Cl.
CPC ................ *G01S 7/36* (2013.01); *G01S 7/356* (2021.05); *G01S 13/584* (2013.01)

(58) Field of Classification Search
CPC combination set(s) only.
See application file for complete search history.

(56) References Cited

U.S. PATENT DOCUMENTS

| | | | |
|---|---|---|---|
| 2008/0158046 | A1 | 7/2008 | Kai |
| 2008/0231496 | A1 | 9/2008 | Sakamoto |
| 2009/0128398 | A1 | 5/2009 | Wieland |
| 2019/0113600 | A1 | 4/2019 | Melzer et al. |

(Continued)

FOREIGN PATENT DOCUMENTS

| | | |
|---|---|---|
| CN | 111427021 A | 7/2020 |
| DE | 10 2005 062 539 A1 | 7/2007 |

(Continued)

OTHER PUBLICATIONS

International Search Report (PCT/ISA/210), issued in PCT/JP2020/046141, dated Feb. 9, 2021.

(Continued)

*Primary Examiner* — Vladimir Magloire
*Assistant Examiner* — Eric K Hodac
(74) *Attorney, Agent, or Firm* — Birch, Stewart, Kolasch & Birch, LLP

(57) ABSTRACT

A waveform shaping unit (220) accumulates beat signals S9, which are beat signals S8 in frame units. A distance calculation unit (252) generates a histogram of range bins using the beat signals S9, and calculates a distance based on a range bin number corresponding to a peak in the histogram as a relative distance of a target object. A velocity calculation unit (253) generates a power spectrum of Doppler bins for each time period or for each range bin using the beat signals S9, generates a difference statistic graph that indicates a statistic of differences between power spectra, and calculates a velocity based on a Doppler bin number corresponding to a peak in the difference statistic graph as a relative velocity of the target object.

16 Claims, 29 Drawing Sheets

(56) References Cited

U.S. PATENT DOCUMENTS

| | | | |
|---|---|---|---|
| 2022/0260691 A1 | 8/2022 | Hirano | |
| 2023/0258768 A1* | 8/2023 | Amadjikpe | ............ G01S 13/87 |
| | | | 342/174 |

FOREIGN PATENT DOCUMENTS

| | | | |
|---|---|---|---|
| DE | 10 2008 014 786 A1 | 10/2008 |
| DE | 11 2020 002 990 T5 | 3/2022 |
| JP | 11-352215 A | 12/1999 |
| JP | 2008-107281 A | 5/2008 |
| JP | 2019-74527 A | 5/2019 |
| JP | 2019-144083 A | 8/2019 |
| JP | 2019-158828 A | 9/2019 |
| JP | 2019-200145 A | 11/2019 |
| JP | 2020-16517 A | 1/2020 |

OTHER PUBLICATIONS

Nashimoto et al., "A Simulation based Security Evaluation of MIMO Radar using Fast FMCW", SCIS 2020, 2020 Symposium on Cryptography and Information Security Kochi, Japan, Jan. 28-31, 2020, The Institute of Electronics, Information and Communication Engineers.

Nashimoto et al., "A Simulation based Security Evaluation of MIMO Radar using Fast FMCW", SCIS 2020, 2020 Symposium on Cryptography and Information Security Kochi, Japan, The Institute of Electronics, Information and Communication Engineers, Jan. 28-31, 2020, pp. 1-8, with a partial English translation of pp. 5 and 7.

German Office Action for German Application No. 11 2020 007 670.9, dated Dec. 10, 2025, with English translation.

* cited by examiner

300: RD MAP

RANGE BINS

DOPPLER BINS

300: RD MAP

RANGE BINS (A)

(T)

DOPPLER BINS

301: SCANNING WINDOW

300: RD MAP

RANGE BINS (A)

(T)

DOPPLER BINS

302: MEDIAN PROCESSING RESULT

RANGE BINS

DOPPLER BINS

BEAT SIGNALS S9

311: RANGE PEAK GRAPH

RANGE BINS

WAVEFORMS

320: POWER SPECTRUM (x-TH SAMPLE TIME PERIOD)

320: POWER SPECTRUM ((x+1)-TH SAMPLE TIME PERIOD)

SIGNAL PROCESSING DEVICE, RADAR DEVICE, AND RADAR OPERATION METHOD

CROSS REFERENCE TO RELATED APPLICATIONS

This application is a Continuation of PCT International Application No. PCT/JP2020/046141, filed on Dec. 10, 2020, which is hereby expressly incorporated by reference into the present application.

TECHNICAL FIELD

The present disclosure relates to radar that detects a target object.

BACKGROUND ART

Radar is a device that emits a radio wave to a target object and measures a reflected wave from the target object so as to measure a relative distance between the radar and the target object, a relative velocity between the radar and the target object, and the like.

An FMCW method is one of radar measurement methods, and is inexpensive but has excellent distance and velocity measurement capability. In particular, a fast FMCW method has higher resolution than that of a conventional slow FMCW method. In the fast FMCW method, a chirp signal has a relatively short sweep time of several microseconds.

FMCW is an abbreviation for frequency modulated continuous wave.

Electronic attacks are a threat when the radar is operated. An electronic attack is an attack that interferes with the detection of an object that actually exists by inserting measurement-interfering radio waves into radio waves of the radar from an outside source.

Non-Patent Literature 1 proposes an advanced electronic attack in addition to conventional electronic attacks.

A conventional electronic attack is an attack that transmits a slow chirp against a fast chirp, and the influence of the electronic attack is suppressed to some extent by a target detection algorithm called a CFAR.

CFAR is an abbreviation for constant false alarm rate.

An advanced electronic attack is an attack that transmits a radio wave that obscures the power originating from an object that actually exists by gradually shifting the frequency according to a radio wave to be jammed. Such an electronic attack is called cover chirp jamming.

Cover chirp jamming aims to deceive the CFAR and is a new type of electronic attack that has not been discussed so far.

Therefore, conventional countermeasures are not effective against cover chirp jamming.

CITATION LIST

Non-Patent Literature

Non-Patent Literature 1: Nashimoto, Fukunaga, et al., "A Simulation based Security Evaluation of MIMO Radar using Fast FMCW", SCIS2020 2020 Symposium on Cryptography and Information Security Kochi, Japan, Jan. 28-31, 2020, The Institute of Electronics, Information and Communication Engineers.

SUMMARY OF INVENTION

Technical Problem

An object of the present disclosure is to make it possible to calculate a relative distance of a target object and a relative velocity of the target object even when cover chirp jamming is being carried out.

Solution to Problem

A signal processing device according to the present disclosure includes a waveform accumulation unit to accumulate beat signals in frame units, the beat signals being digital signals obtained from a mixing signal obtained by performing mixing of a local wave that is transmitted to detect a target object and a received wave that is received as a reflected wave corresponding to the local wave;

a distance calculation unit to generate a histogram of range bins using the beat signals in frame units, and calculate a distance based on a range bin number corresponding to a peak in the histogram as a relative distance of the target object; and a velocity calculation unit to generate a power spectrum of Doppler bins for each time period or for each range bin using the beat signals in frame units, generate a difference statistic graph that indicates a statistic of differences between power spectra, and calculate a velocity based on a Doppler bin number corresponding to a peak in the difference statistic graph as a relative velocity of the target object.

Advantageous Effects of Invention

According to the present disclosure, a relative distance of a target object and a relative velocity of the target object can be calculated even when cover chirp jamming is being carried out.

DESCRIPTION OF EMBODIMENTS

In the embodiments and drawings, the same elements or corresponding elements are denoted by the same reference sign. Description of an element denoted by the same reference sign as that of an element that has been described will be suitably omitted or simplified.

Arrows in diagrams mainly indicate flows of signals, flows of data, or flows of processing. A filled circle marks a branch point from which a signal or data flows in a plurality of directions.

Embodiment 1

A radar device 100 will be described based on FIGS. 1 to 24.

The radar device 100 calculates a relative distance of a target object and a relative velocity of the target object by radar measurement.

The target object is a target to be detected by radar measurement.

The relative distance of the target object is a distance from the radar device 100 to the target object.

The relative velocity of the target object is a velocity of the target object in relation to the radar device 100. When the radar device 100 does not move during radar measurement, the relative velocity of the target object simply means the velocity of the target object.

*Description of Configuration*

Figure 1:
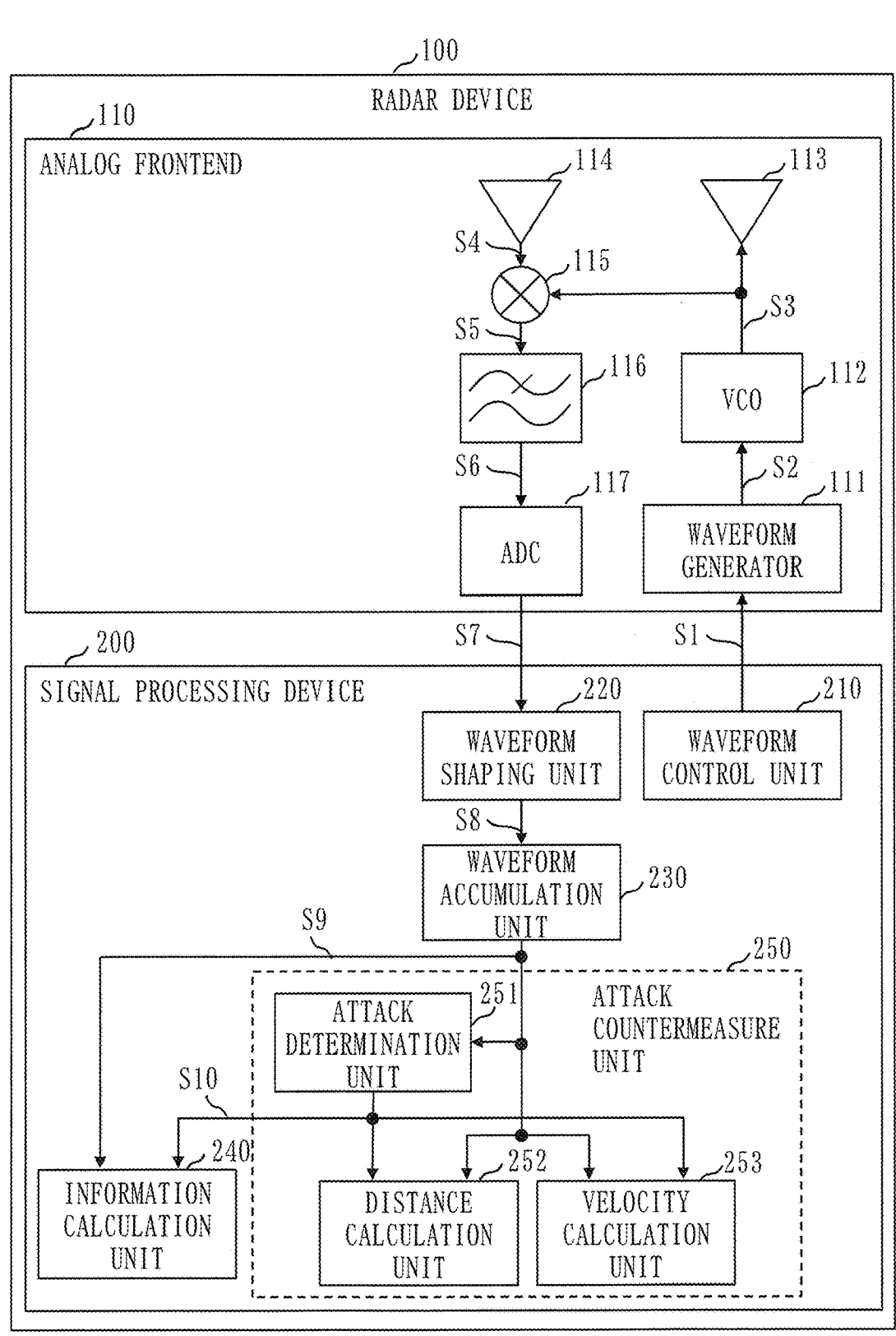
FIG. 1 is a configuration diagram of a radar device 100 in Embodiment 1.

Based on FIG. 1, a configuration of the radar device 100 will be described.

The radar device 100 includes an analog frontend 110 and a signal processing device 200.

The analog frontend 110 is an analog circuit, and includes circuits such as a waveform generator 111, a VCO 112, a transmission antenna 113, a reception antenna 114, a mixer 115, a low-pass filter 116, and an ADC 117. These circuits are connected with one another through signal lines.

VCO is an abbreviation for voltage-controlled oscillator.

ADC is an abbreviation for analog-to-digital converter.

Figure 2:
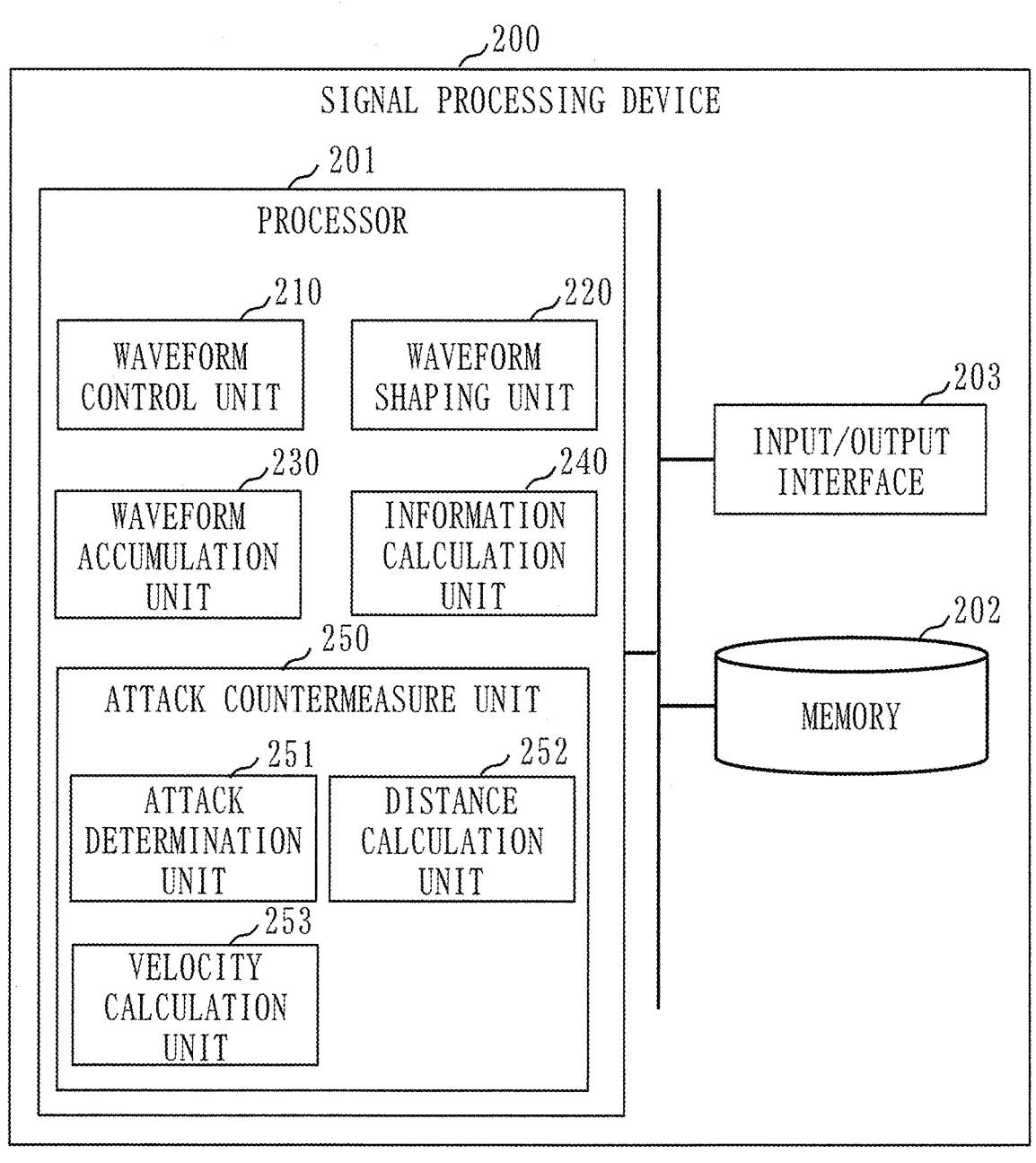
FIG. 2 is a configuration diagram of a signal processing device 200 in Embodiment 1.

Based on FIG. 2, a configuration of the signal processing device 200 will be described.

The signal processing device 200 includes hardware such as a processor 201, a memory 202, and an input/output interface 203. These hardware components are connected with one another through signal lines.

The processor 201 is an IC that performs operational processing, and controls other hardware components. For example, the processor 201 is a CPU, a DSP, or a GPU.

IC is an abbreviation for integrated circuit.

CPU is an abbreviation for central processing unit.

DSP is an abbreviation for digital signal processor.

GPU is an abbreviation for graphics processing unit.

The memory 202 is at least one of a volatile storage device and a non-volatile storage device. A specific example of the volatile storage device is a RAM. Specific examples of the non-volatile storage device are a ROM, an HDD, and a flash memory.

RAM is an abbreviation for random access memory.

ROM is an abbreviation for read only memory.

HDD is an abbreviation for hard disk drive.

The input/output interface 203 is an interface for input and output. For example, the input/output interface 203 is a serial communication interface. Specific examples of the serial communication interface are SPI, UART, and I2C.

SPI is an abbreviation for Serial Peripheral Interface.

UART is an abbreviation for universal asynchronous receiver transmitter.

I2C is an abbreviation for Inter-Integrated Circuit.

The signal processing device 200 includes elements such as a waveform control unit 210, a waveform shaping unit 220, a waveform accumulation unit 230, an information calculation unit 240, and an attack countermeasure unit 250. The attack countermeasure unit 250 includes elements such as an attack determination unit 251, a distance calculation unit 252, and a velocity calculation unit 253. These elements are realized by software.

The memory 202 stores a radar operation program to cause a computer to function as the waveform control unit 210, the waveform shaping unit 220, the waveform accumulation unit 230, the information calculation unit 240, and the attack countermeasure unit 250. The radar operation program is executed by the processor 201.

The memory 202 further stores an OS. The OS is executed by the processor 201.

The processor 201 executes the radar operation program while executing the OS.

OS is an abbreviation for operating system.

Input data and output data of the radar operation program are stored in the memory 202.

The signal processing device 200 may include a plurality of processors as an alternative to the processor 201.

The radar operation program can be recorded (stored) in a computer readable format in a non-volatile recording medium such as an optical disc or a flash memory.

*Description of Operation*

A procedure for operation of the radar device 100 is equivalent to a radar operation method, and a procedure for operation of the signal processing device 200 is equivalent to a signal processing method. The procedure for operation of the signal processing device 200 is also equivalent to a procedure for processing by the radar operation program.

Figure 3:
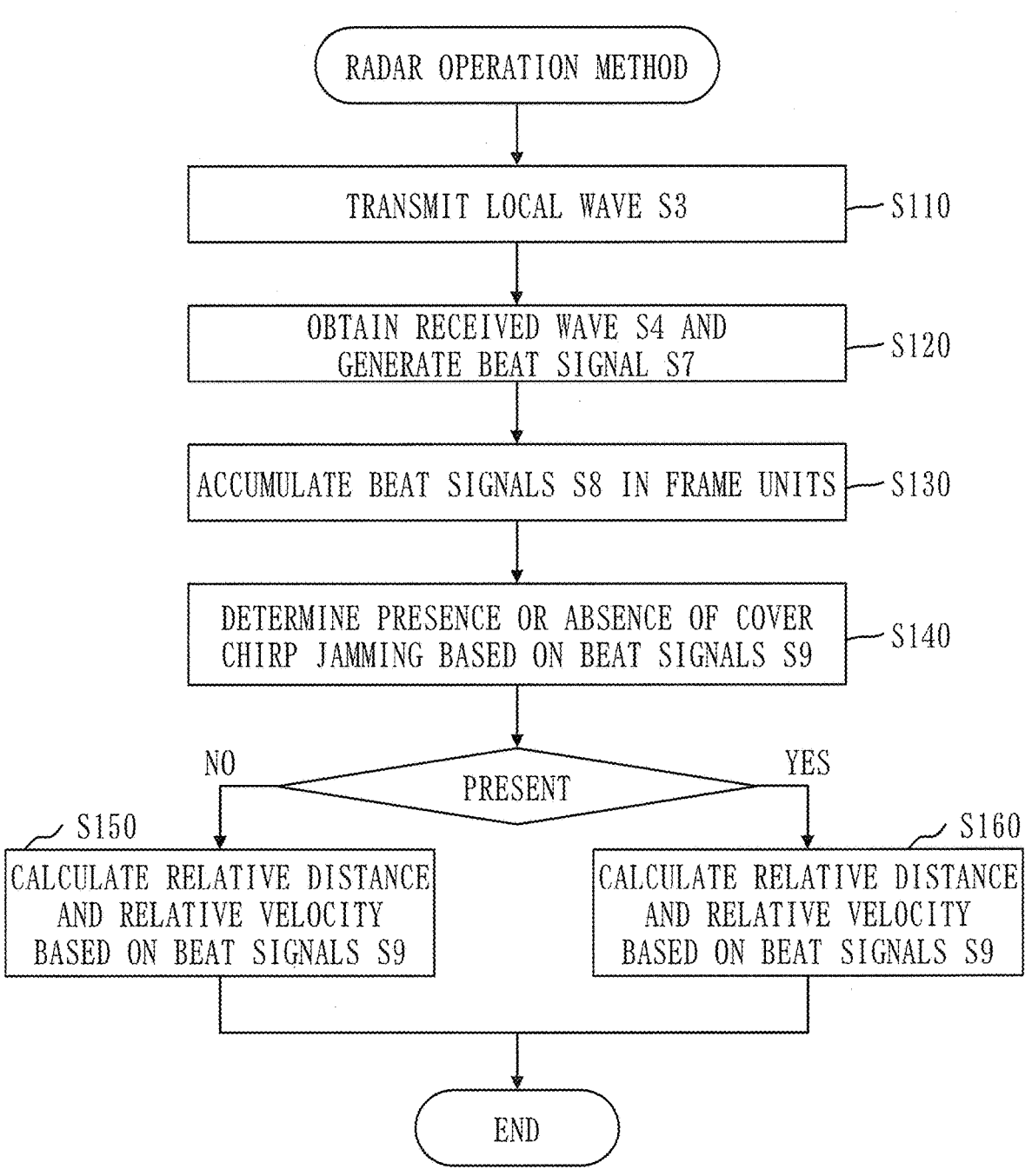
FIG. 3 is a flowchart of a radar operation method in Embodiment 1.

Based on FIG. 3, the radar operation method will be described.

In step S110, the analog frontend 110 transmits a local wave S3.

5

Figure 4:
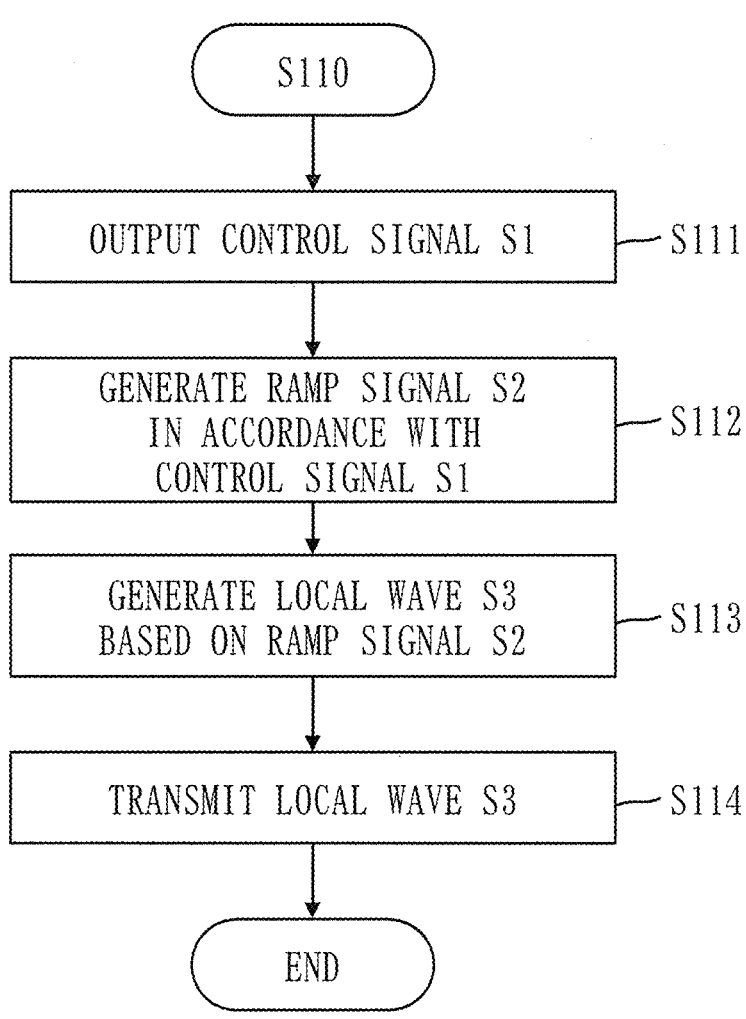
FIG. 4 is a flowchart of step S110 in Embodiment 1.

Based on FIG. 4, a procedure for step S110 will be described.

In step S111, the waveform control unit 210 generates a control signal S1, and outputs the generated control signal S1. The control signal S1 is a signal to instruct generation of a ramp signal S2.

The output control signal S1 is input to the waveform generator 111.

In step S112, the waveform generator 111 generates the ramp signal S2 in accordance with the control signal S1, and outputs the generated ramp signal S2. The ramp signal S2 is a signal that represents a sloping voltage waveform.

Radar measurement methods include a method called FMCW. When FMCW is used, the slope of the voltage waveform of the ramp signal S2 is represented as "Bw/Ts". "Bw" means bandwidth, and "Ts" means sweep time.

The output ramp signal S2 is input to the VCO 112.

In step S113, the VCO 112 generates the local wave S3 with an oscillation frequency based on the ramp signal S2, and outputs the generated local wave S3. The local wave S3 is a signal with a waveform of a frequency corresponding to the waveform of the ramp signal S2.

The output local wave S3 is input to each of the transmission antenna 113 and the mixer 115.

In step S114, the transmission antenna 113 transmits the local wave S3 as a radio wave in order to detect a target object.

Referring back to FIG. 3, the description will be continued from step S120.

In step S120, the analog frontend 110 obtains a received wave S4 and generates a beat signal S7.

Figure 5:
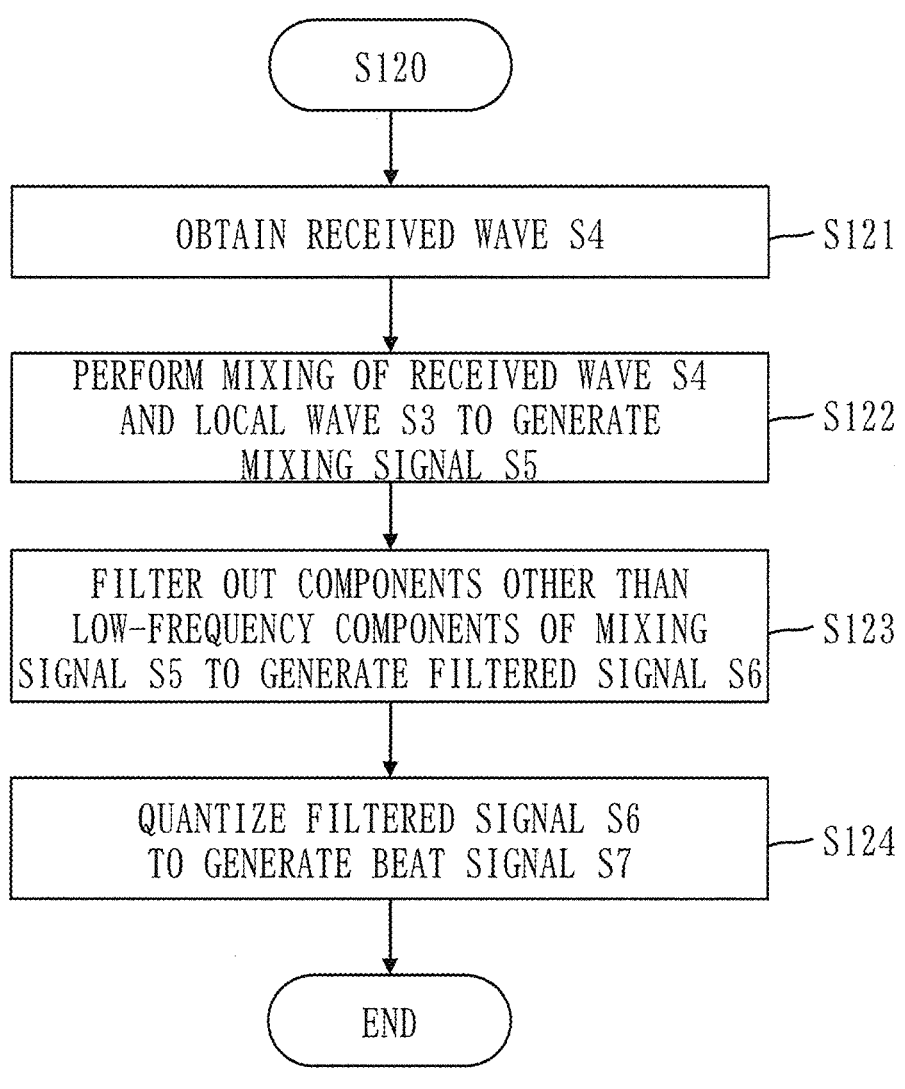
FIG. 5 is a flowchart of step S120 in Embodiment 1.

Based on FIG. 5, a procedure for step S120 will be described.

In step S121, the reception antenna 114 receives a radio wave as the received wave S4, and outputs the received wave S4 that has been received.

The received wave S4 is equivalent to the local wave S3 (radio wave) that has reflected off the target object or the like. If the radio wave has reflected off the target object, the frequency of the radio wave changes. Therefore, the received wave S4 contains information on a change in frequency that has occurred due to the relative distance of the target object and the relative velocity of the target object.

The output received wave S4 is input to the mixer 115.

In step S122, the mixer 115 performs mixing of the received wave S4 and the local wave S3 input in step S113.

Mixing is equivalent to a multiplication of signals, and can be expressed by Formula (1).

$$\cos(f_s t)\cdot\cos(f_r t)=[\cos\{(f_s-f_r)t\}+\cos\{(f_s+f_r)t\}]/2 \qquad \text{Formula (1)}$$

"$f_s$" represents the frequency of the local wave S3. "$f_r$" represents the frequency of the received wave S4. "cos" represents a cosine function. "t" represents time. "$f_s$" and "$f_r$" typically represent frequencies that change over time. Specifically, "$f_s$" and "$f_r$" represents frequencies corresponding to chirp signals.

A signal that is generated by this mixing will be referred to as a mixing signal S5.

The mixer 115 outputs the generated mixing signal S5.

The output mixing signal S5 is input to the low-pass filter 116.

In step S123, the low-pass filter 116 filters out components other than low-frequency components of the mixing signal S5. A signal that is generated by this will be referred to as a filtered signal S6. The filtered signal S6 is equivalent to the low-frequency components extracted from the mixing signal S5.

The low-frequency components are frequency components whose frequency is lower than a predetermined frequency, and is also called low-band components. Specifically, components whose frequency is equal to or lower than $(f_s-f_r)$ are low-frequency components. Components whose frequency is equal to or higher than $(f_s+f_r)$ are not low-frequency components.

The filtered signal S6 can be represented by Formula (2) based on Formula (1).

$$\cos\{(f_s-f_r)t\}/2 \qquad \text{Formula (2)}$$

That is, the filtered signal S6 has information on a difference in frequency between the local wave S3 and the received wave S4.

The low-pass filter 116 outputs the generated filtered signal S6.

The output filtered signal S6 is input to the ADC 117.

In step S117, the ADC 117 converts the filtered signal S6, which is an analog signal, to a digital signal. Specifically, the ADC 117 quantizes the filtered signal S6.

A digital signal that is generated by this will be referred to as the beat signal S7. The beat signal S7 is equivalent to the filtered signal S6 that has been digitalized.

The ADC 117 outputs the generated beat signal S7.

The output beat signal S7 is input to the signal processing device 200.

Referring back to FIG. 3, the description will be continued from step S130.

In step S130, the waveform accumulation unit 230 accumulates beat signals S8 in frame units.

Figure 6:
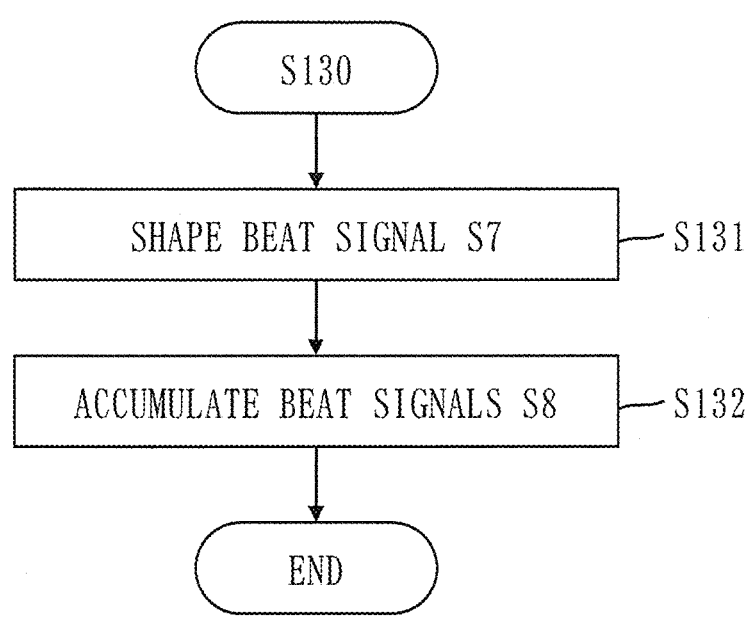
FIG. 6 is a flowchart of step S130 in Embodiment 1.

Based on FIG. 6, a procedure for step S130 will be described.

In step S131, the waveform shaping unit 220 shapes the beat signal S7.

A specific example of shaping is processing called blanking. Blanking is processing to remove both ends of a signal for each sample time period. By blanking, portions with a large difference in frequency are excluded in repeat sections of the beat signal S7, and attention can be focused only on the $(f_s-f_r)$ frequency.

The shaped beat signal S7 will be referred to as the beat signal S8.

In step S132, the waveform accumulation unit 230 accumulates the beat signals S8 in frame units in the memory 202. The accumulated beat signals S8 are handled as the beat signals S8 in frame units.

The beat signals S8 in frame units will be described.

Radar measurement methods include a method called fast FMCW. In fast FMCW, a relative distance and a relative velocity are calculated based on a set of waveforms. These waveforms constitute one frame.

The beat signals S8 in frame units will be referred to as beat signals S9.

Referring back to FIG. 3, the description will be continued from step S140.

In step S140, the attack determination unit 251 determines the presence or absence of cover chirp jamming based on the beat signals S9, and outputs an attack determination result S10.

Cover chirp jamming is a type of electronic attack.

Step S140 will be described in detail later.

If the attack determination result S10 indicates the presence of cover chirp jamming, processing proceeds to step S160.

If the attack determination result S10 indicates the absence of cover chirp jamming, processing proceeds to step S150.

In step S150, the information calculation unit 240 calculates the relative distance of the target object and the relative velocity of the target object based on the beat signals S9.

Specifically, the information calculation unit 240 calculates the relative distance of the target object and the relative velocity of the target object by performing a 2D-FFT on the beat signals S9.

2D-FFT is an abbreviation for two-dimensional fast Fourier transform. The 2D-FFT is an FFT processing method that applies both a range FFT to be described later and a Doppler FFT to be described later.

The FFT is a type of Fourier transform.

In step S160, the distance calculation unit 252 calculates the relative distance of the target object based on the beat signals S9. However, the calculation method is different from the method in step S150.

The velocity calculation unit 253 also calculates the relative velocity of the target object based on the beat signals S9. However, the calculation method is different from the method in step S150.

Step S160 will be described in detail later.

Figure 7:
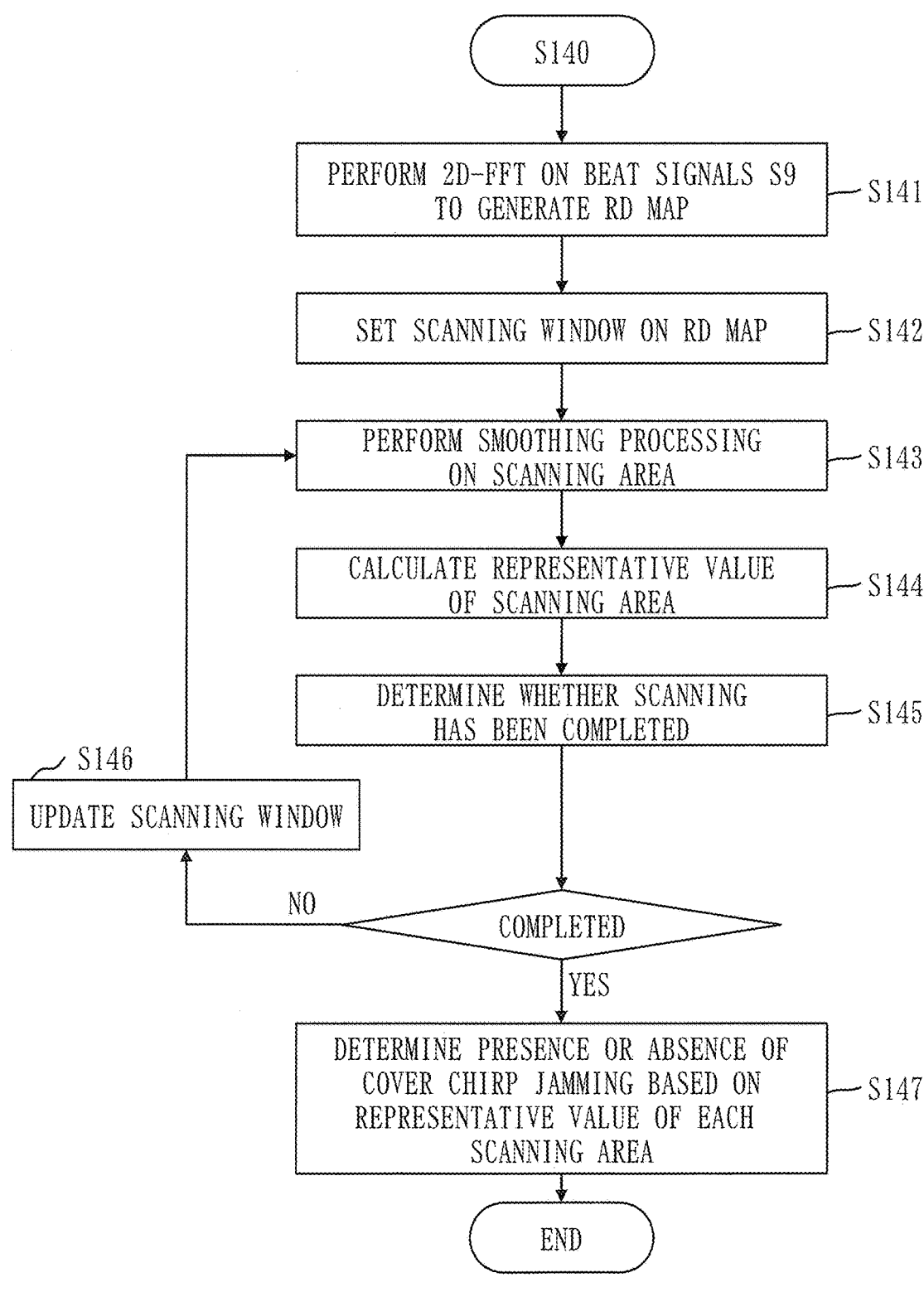
FIG. 7 is a flowchart of step S140 in Embodiment 1.

Based on FIG. 7, an attack determination process (S140) will be described.

In step S141, the attack determination unit 251 performs the 2D-FFT on the beat signals S9. As a result, an RD map is generated.

RD means Range-Doppler.

Figure 8:
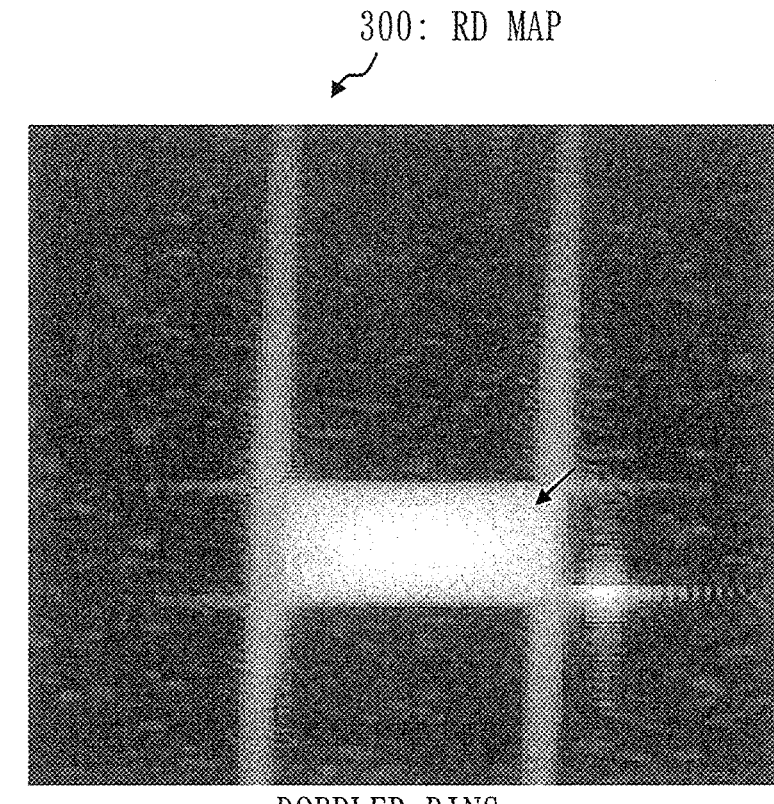
FIG. 8 is a diagram illustrating an image of an RD map 300 in Embodiment 1.
Figure 9:
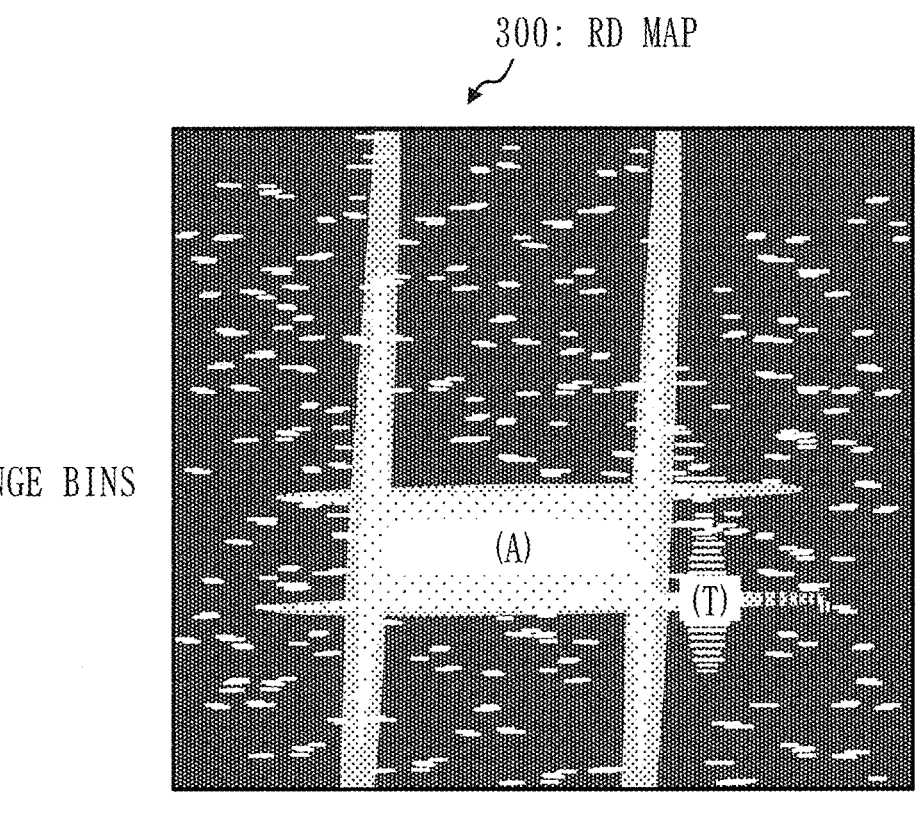
FIG. 9 is a schematic diagram of the RD map 300 in Embodiment 1.

FIGS. 8 and 9 illustrate an RD map 300. FIG. 8 illustrates an image of the RD map 300, and FIG. 9 is a schematic diagram of the RD map 300. The RD map 300 is a specific example of an RD map.

In the RD map 300, the vertical axis indicates consecutive Doppler bins and the horizontal axis indicates consecutive range bins. A doppler bin is a unit of Doppler scale, and a range bin is a unit of range scale. In the FFT, a signal is processed in units of powers of two (called NFFT), and range (distance) and Doppler (velocity) are partitioned according to this unit. Bins are equivalent to equal-width sections that are used when a histogram is plotted.

More specifically, Doppler bins are obtained by converting frequencies (Doppler frequencies) that have been converted into the frequency domain by the FFT into Doppler information based on Formula (3). Similarly, range bins are obtained by converting frequencies (range frequencies) that have been converted into the frequency domain by the FFT into range information based on Formula (4).

$$f_d = 2v_d/\lambda \qquad\qquad \text{Formula (3)}$$

$$f_r = 2R/c \times Bw/T_s \qquad\qquad \text{Formula (4)}$$

Note that $f_d$ is a Doppler frequency, $v_d$ is a relative velocity (Doppler information), $\lambda$ is a wavelength, $f_r$ is a range frequency, R is a distance (range information), and c is the speed of light.

An identifier of each Doppler bin will be referred to as a Doppler bin number, and an identifier of each range bin will be referred to as a range bin number.

In the situation where the RD map 300 is obtained, there are two target objects and cover chirp jamming is being carried out on one of the target objects.

In FIG. 9, a section (A) indicates an area affected by cover chirp jamming, and a section (T) indicates a place where one of the target objects is located. The location of the other one of the target objects is included in the section (A).

Referring back to FIG. 7, the description will be continued from step S142.

In step S142, the attack determination unit 251 sets a scanning window on the RD map. For example, the scanning window is set in the upper left corner of the RD map.

The scanning window is a frame of a specific size. For example, the size of the scanning window is determined based on the Doppler bin resolution and the range bin resolution. The scanning window is sufficiently large in relation to the Doppler bin resolution and the range bin resolution.

Figure 10:
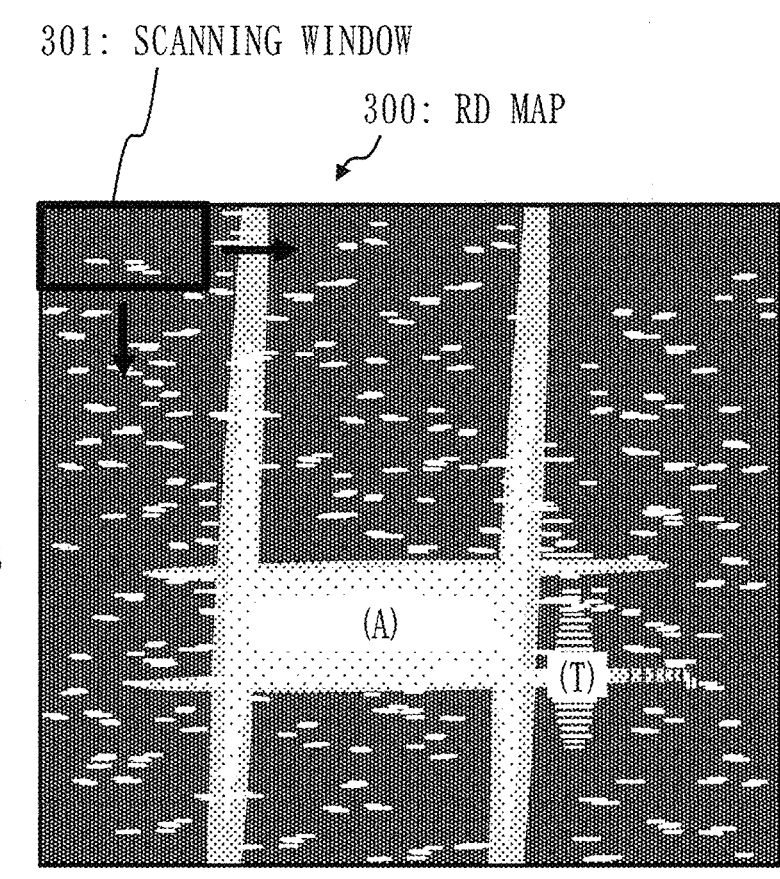
FIG. 10 is a diagram illustrating the RD map 300 and a scanning window 301 in Embodiment 1.

FIG. 10 illustrates the RD map 300 in which a scanning window 301 is set in the upper left corner.

In step S143, the attack determination unit 251 performs smoothing processing on the area inside the scanning window. The area inside the scanning window will be referred to as a "scanning area".

Specific smoothing processing is processing to obtain the median (median processing). However, other types of smoothing processing, such as processing to obtain the arithmetic mean value (arithmetic mean processing), may be performed.

In step S144, the attack determination unit 251 calculates a representative value of the scanning area based on the result of the smoothing processing.

For example, the representative value is a value such as the maximum value, arithmetic mean value, median, variance, or standard deviation.

In step S145, the attack determination unit 251 determines whether scanning using the scanning window has been completed for all areas in the RD map.

If scanning has been completed, processing proceeds to step S147.

If scanning has not been completed, processing proceeds to step S146.

In step S146, the attack determination unit 251 updates the position of the scanning window.

Specifically, the attack determination unit 251 shifts the scanning window by a specific amount in at least one of the range bin direction and the Doppler bin direction in the RD map (see FIG. 10). For example, the specific amount in the range bin direction is one unit in the range bin direction, and the specific amount in the Doppler bin direction is one unit in the Doppler bin direction. However, the scanning window may be shifted by a large amount, for example, five units.

After step S146, processing proceeds to step S143.

In step S147, the attack determination unit 251 determines the presence or absence of cover chirp jamming based on the representative value of each scanning area.

For example, the attack determination unit 251 calculates an overall representative value of the RD map based on the representative value of each scanning area. Then, the attack determination unit 251 compares the overall representative value with a threshold value. If the overall representative value is greater than the threshold value, the attack determination unit 251 determines the presence of cover chirp jamming.

For example, the attack determination unit 251 compares the representative value of each scanning area with a first threshold value, and counts the number of representative values greater than the first threshold value. Then, the attack determination unit 251 compares the counted number with a second threshold value. If the counted number is greater than the second threshold value, the attack determination unit 251 determines the presence of cover chirp jamming.

Figure 11:
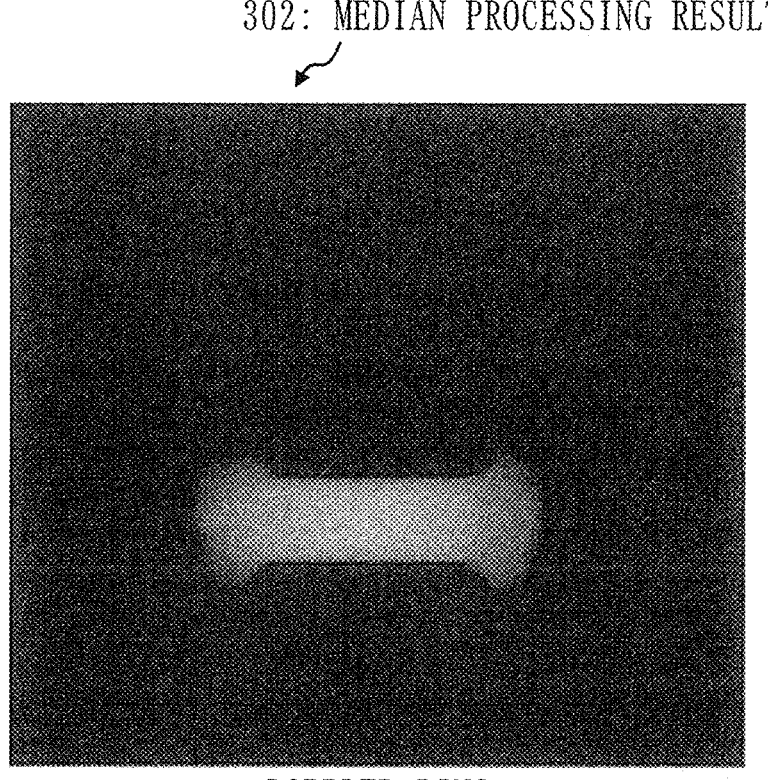
FIG. 11 is a diagram illustrating an image of a median processing result 302 in Embodiment 1.
Figure 12:
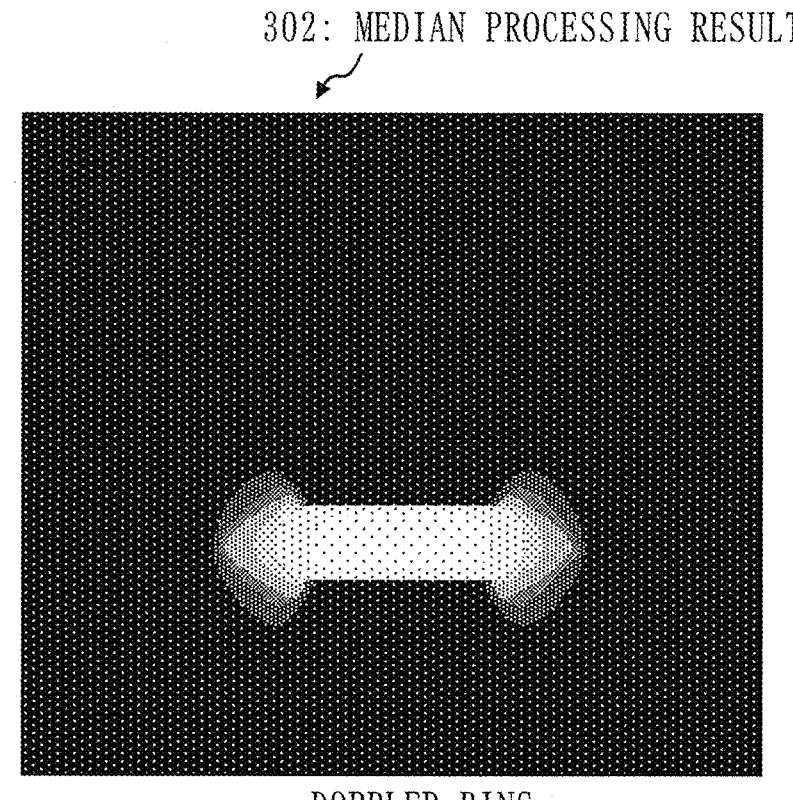
FIG. 12 is a schematic diagram of the median processing result 302 in Embodiment 1.

FIGS. 11 and 12 illustrate a median processing result 302. FIG. 11 illustrates an image of the median processing result 302, and FIG. 12 is a schematic diagram of the median processing result 302. The median processing result 302 is equivalent to the RD map 300 on which median processing has been performed (see FIGS. 8 to 10).

In the RD map 300, the power of cover chirp jamming appears to spread out more than the power of the target object. Therefore, if the scanning window 301 is in the area (A) affected by cover chirp jamming, the power of cover chirp jamming is present in the entire area of the scanning window 301, resulting in a large median value. If the scanning window 301 is in an area not affected by cover chirp jamming, a small median value is obtained even if the target object is present, provided that the scanning window 301 is sufficiently large.

Therefore, when the medians are obtained for all the areas in the RD map 300 by shifting the scanning window 301, the median processing result 302 as illustrated in FIGS. 11 an 12 is obtained.

Then, by comparing the representative value of each area in the median processing result 302 with the threshold value, an area affected by cover chirp jamming can be detected.

Figure 13:
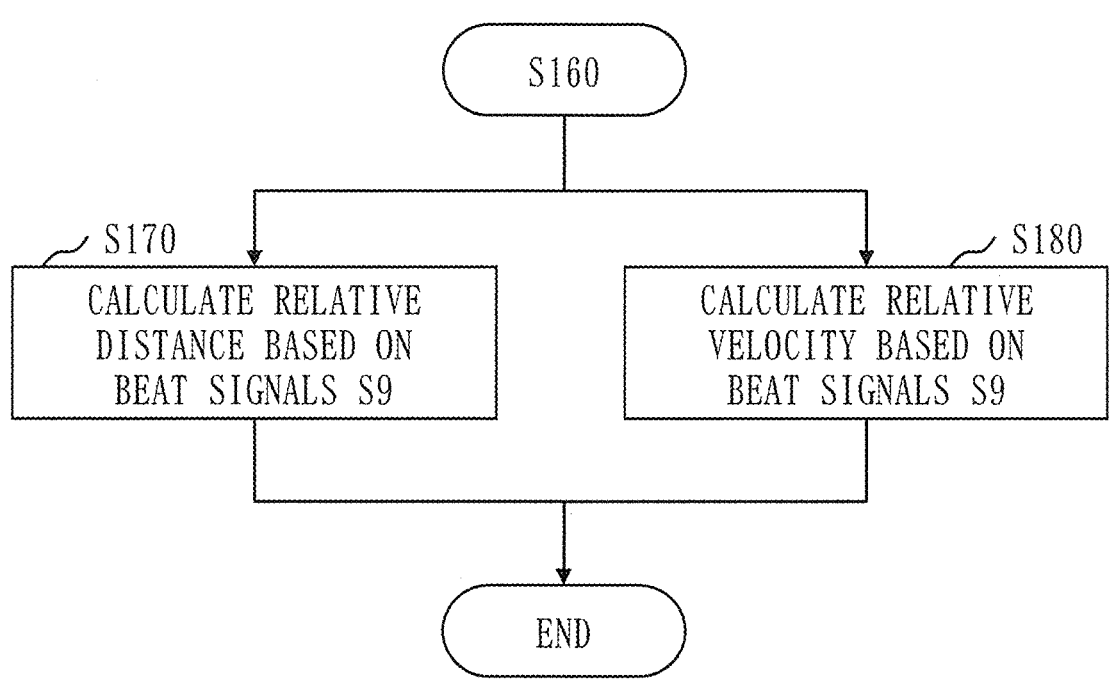
FIG. 13 is a flowchart of step S160 in Embodiment 1.

Based on FIG. 13, step S160 will be described.

In step S170, the distance calculation unit 252 calculates the relative distance of the target object based on the beat signals S9.

Figure 14:
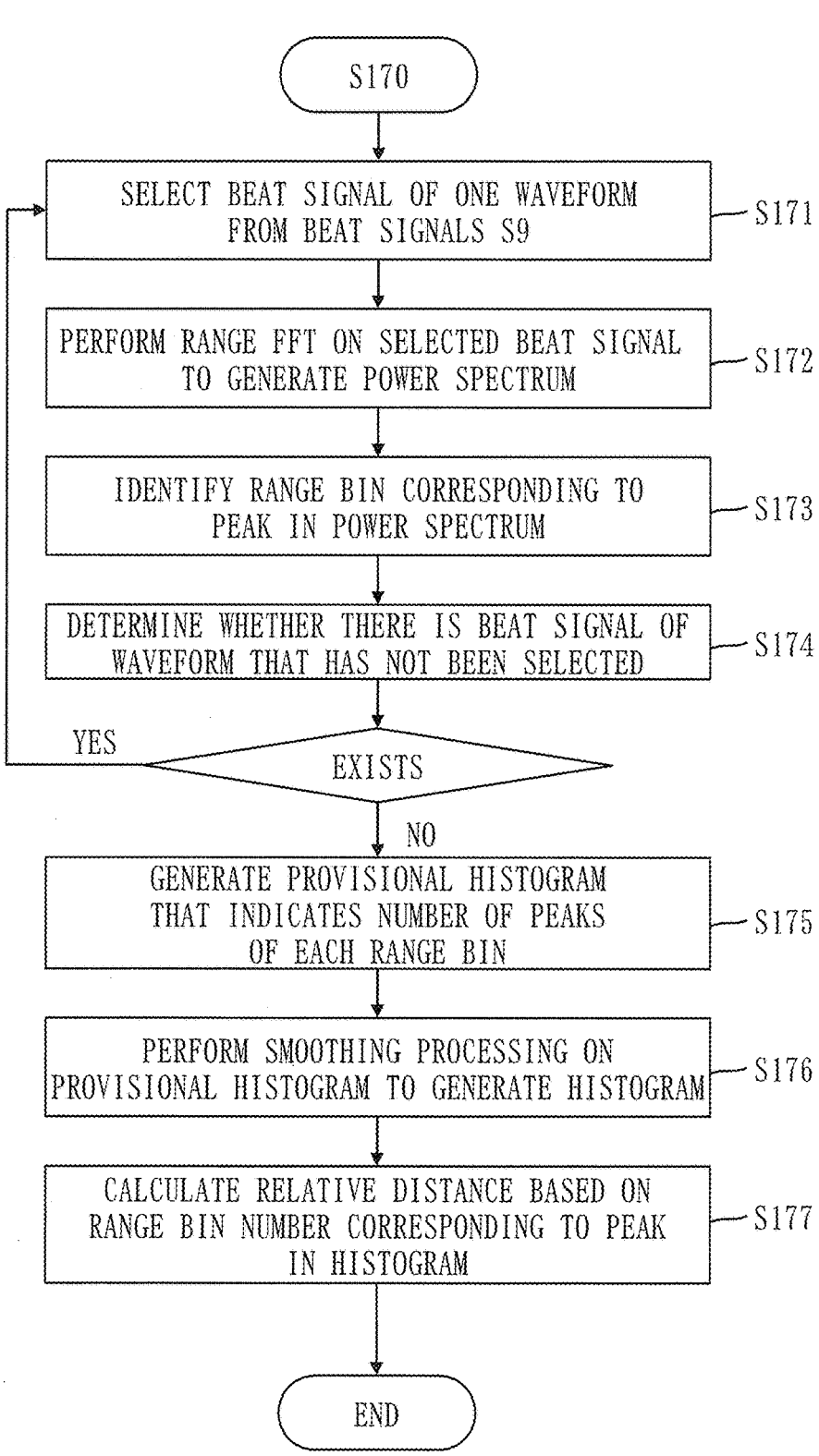
FIG. 14 is a flowchart of step S170 in Embodiment 1.

Based on FIG. 14, a procedure for a distance calculation process (S170) will be described.

In step S171, the distance calculation unit 252 selects a beat signal of one waveform from the beat signals S9. The beat signal that has been selected will be referred to as a "selected beat signal".

In step S172, the distance calculation unit 252 performs the range FFT on the selected beat signal. The range FFT is an FFT to obtain a range (distance) by performing the FFT on the beat signals in a sampling time direction. By the range FFT, a change in frequency due to round-trip time can be found out, and the distance is obtained.

Then, the distance calculation unit 252 calculates the power of the data obtained by the range FFT for each range bin, and generates a power spectrum of range bins.

Figure 15:
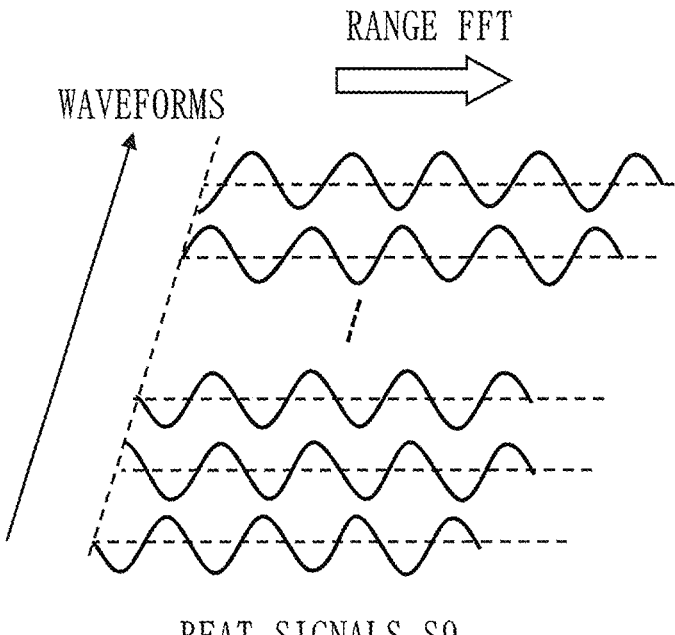
FIG. 15 is a schematic diagram of beat signals S9 in Embodiment 1.

FIG. 15 illustrates a schematic diagram of the beat signals S9.

The beat signals S9 include beat signals with different waveforms. That is, the beat signals S9 include beat signals whose waveforms are different.

The distance calculation unit 252 selects a beat signal of one waveform from the beat signals S9 at a time (S171), and performs the range FFT on the beat signal of one waveform at a time (S172).

Referring back to FIG. 14, the description will be continued from step S173.

In step S173, the distance calculation unit 252 identifies each peak in the power spectrum of range bins, identifies the range bin corresponding to each peak, and stores the range bin number corresponding to each peak.

Each peak is also called a local peak or a range peak.

Each peak is identified by a method such as a hill-climbing method. For example, the distance calculation unit 252 identifies a point at which monotonous increase turns to monotonous decrease as a local peak.

Figure 16:
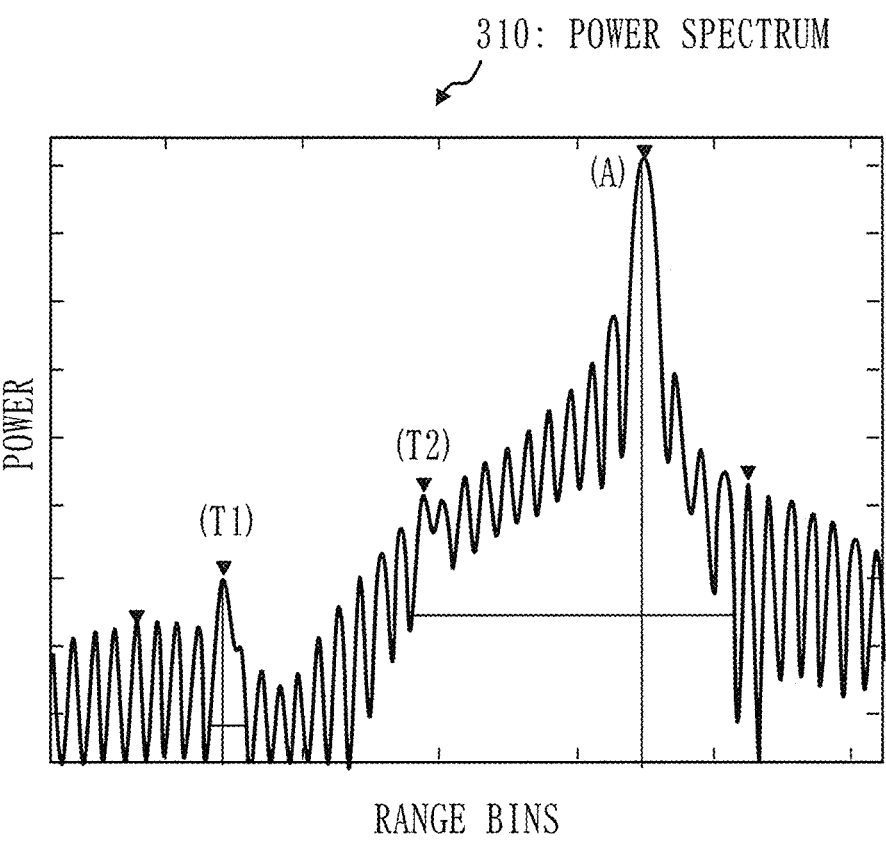
FIG. 16 is a diagram illustrating a power spectrum 310 in Embodiment 1.
Figure 17:
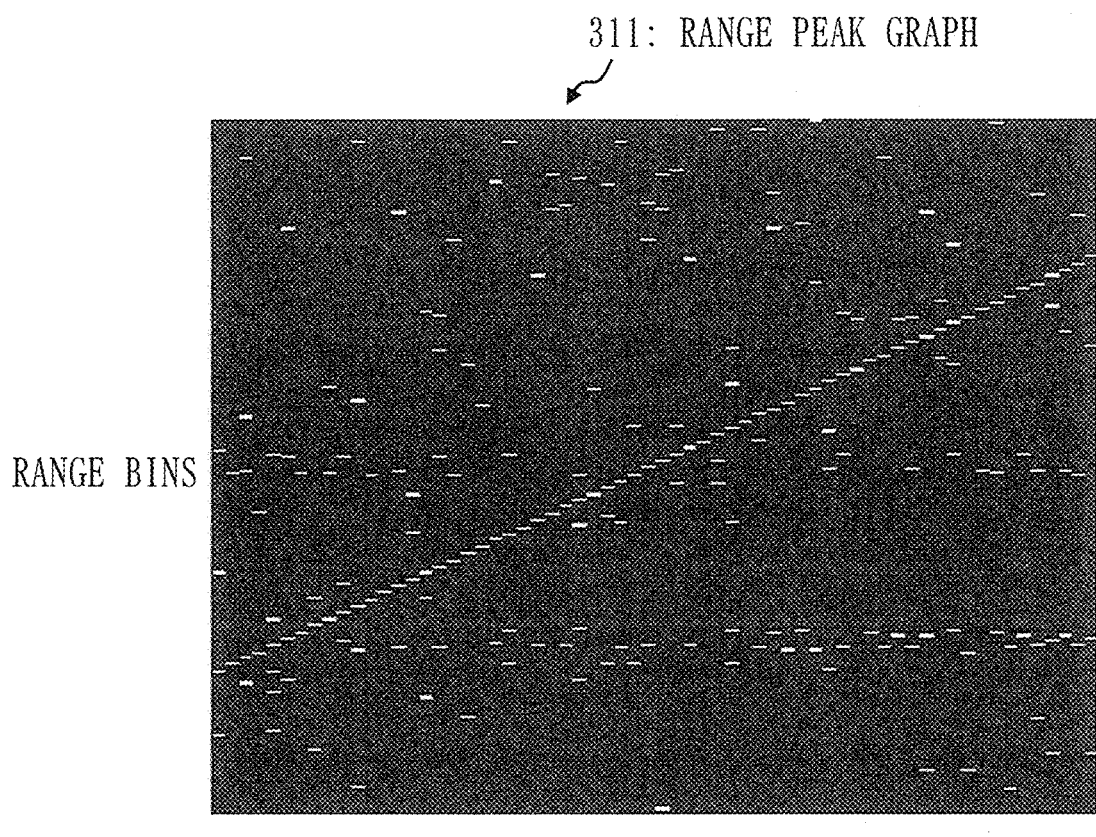
FIG. 17 is a diagram illustrating an image of a range peak graph 311 in Embodiment 1.

FIG. 16 illustrates a power spectrum 310. The power spectrum 310 is a specific example of the power spectrum of range bins.

The power spectrum 310 indicates the power of each range bin. A downward-pointing filled triangle indicates a local peak. A local peak (A) is a local peak corresponding to cover chirp jamming, and local peaks (T1) and (T2) are local peaks corresponding to the target objects.

The situation represented by the power spectrum 310 is the same as the situation represented by the RD map 300 (see FIGS. 8 and 9). That is, there are two target objects, and cover chirp jamming is being carried out on one of the target objects. The power of cover chirp jamming is dominant, and the local peak (T2) corresponding to one of the target objects is buried.

Referring back to FIG. 14, the description will be continued from step S174.

In step S174, the distance calculation unit 252 determines whether there is a beat signal of a waveform that has not been selected.

If there is a beat signal of a waveform that has not been selected, processing proceeds to step S171.

If there is no beat signal of a waveform that has not been selected, processing proceeds to step S175.

Figure 18:
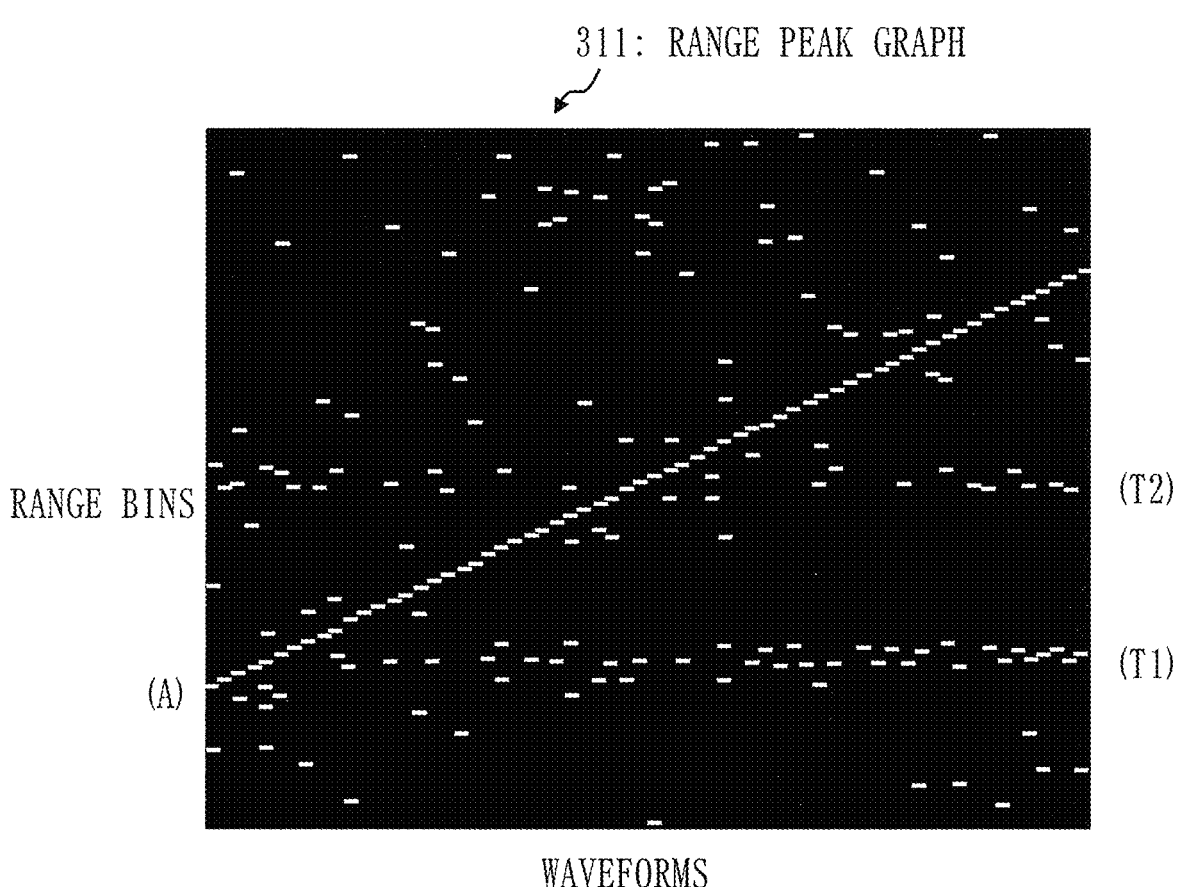
FIG. 18 is a schematic diagram of the range peak graph 311 in Embodiment 1.

FIG. 18 illustrates a range peak graph 311.

The range peak graph 311 is a specific example of a graph representing range bins corresponding to individual local peaks in the power spectra obtained from the beat signals of respective waveforms, and is generated using the results of step S173.

Range bins (T1) and (T2) are range bins of local peaks corresponding to the target objects and do not vary with the waveform. Therefore, in the range peak graph 311, a group of points corresponding to each of the target objects is aligned in the waveform direction.

A range bin (A) is a range bin of local peaks corresponding to cover chirp jamming and varies with the waveform. In the range peak graph 311, a group of points corresponding to cover chirp jamming is aligned diagonally in a straight line. This is because the frequency is gradually shifted in cover chirp jamming.

Referring back to FIG. 14, the description will be continued from step S175.

In step S175, the distance calculation unit 252 calculates, for each range bin, the number of times each range bin has been identified as the range bin corresponding to a peak. Specifically, the distance calculation unit 252 calculates, for each range bin, the number of times the range bin number is stored in step S173.

The calculated number of times means the sum or arithmetic mean, and will be referred to as the "number of peaks" "number of appearances", or "number of local peak appearances".

Then, the distance calculation unit 252 generates a histogram that indicates the number of peaks of each range bin. The generated histogram will be referred to as a "provisional histogram".

In step S176, the distance calculation unit 252 performs smoothing processing on the provisional histogram. A specific example of smoothing processing is processing to obtain the moving average (moving average processing).

The provisional histogram on which smoothing processing has been performed will be referred to as a histogram of range bins.

In step S177, the distance calculation unit 252 identifies a peak in the histogram of range bins, and identifies the range bin corresponding to the peak.

Then, the distance calculation unit 252 calculates the relative distance of the target object based on the range bin number corresponding to the peak.

Figure 19:
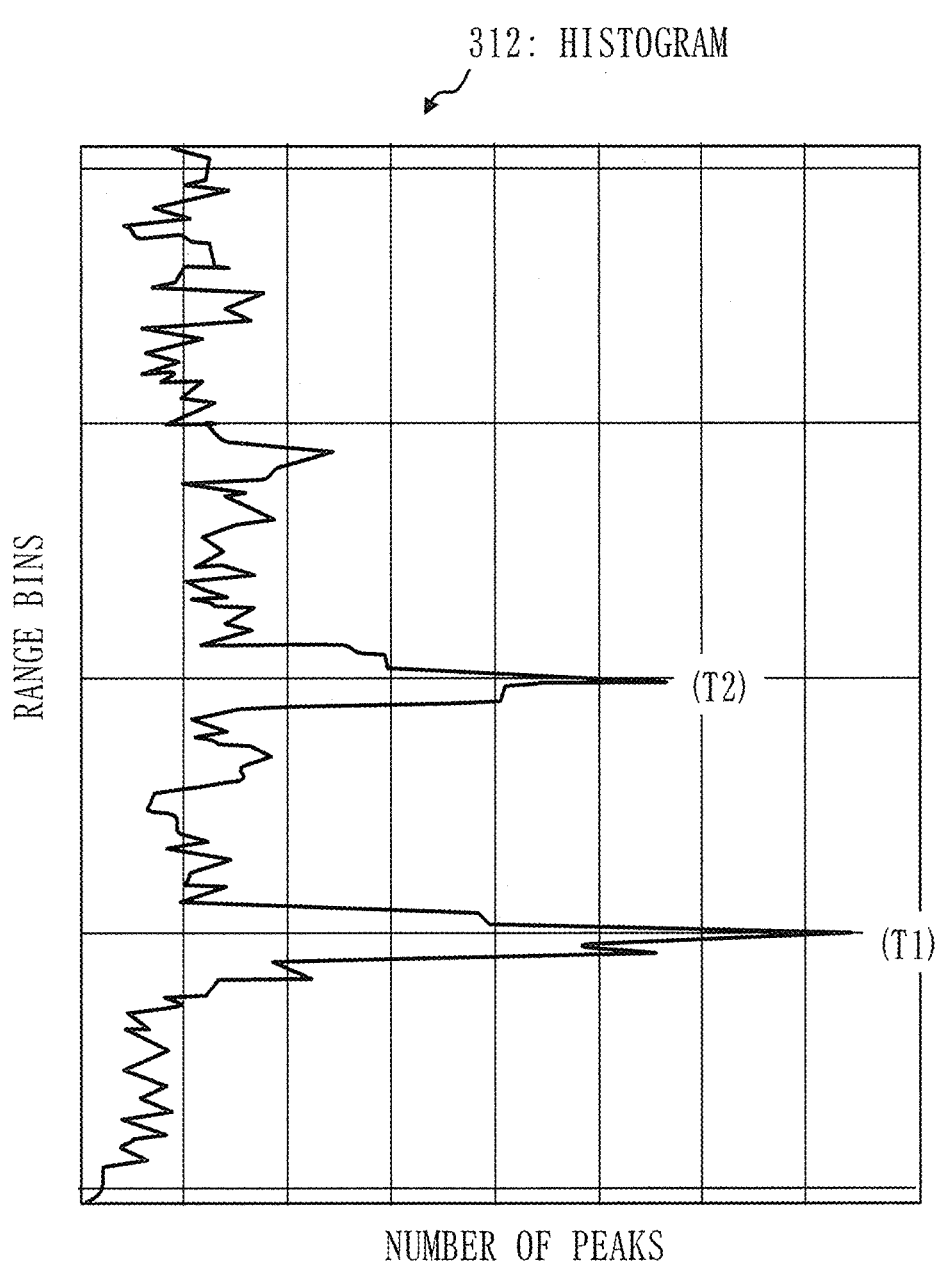
FIG. 19 is a diagram illustrating a histogram 312 in Embodiment 1.

FIG. 19 illustrates a histogram 312. The histogram 312 is a specific example of the histogram of range bins.

By using the histogram 312, it is possible to ignore the strong power of cover chirp jamming, focus attention on the appearance frequency of peaks, and identify the range bin numbers corresponding to the target objects (T1) and (T2).

Referring back to FIG. 13, step S180 will be described.

In step S180, the velocity calculation unit 253 calculates the relative velocity of the target object based on the beat signals S9.

Figure 20:
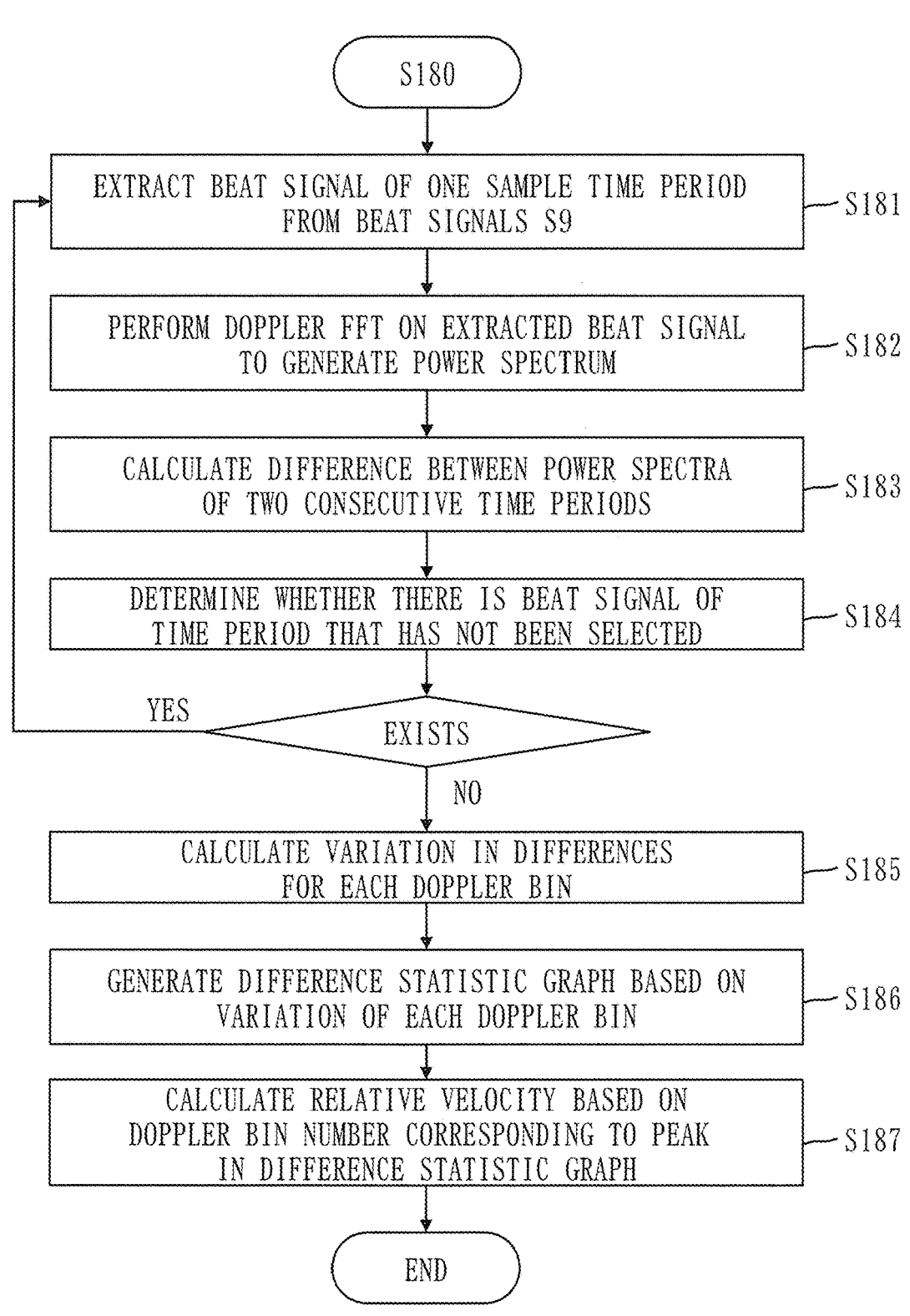
FIG. 20 is a flowchart of step S180 in Embodiment 1.

Based on FIG. 20, a procedure for a velocity calculation process (S180) will be described.

In step S181, the velocity calculation unit 253 extracts a beat signal of one sample time period from the beat signals S9. The sample time period is a predetermined time period, and a beat signal of one sample time period is a beat signal of one time period.

The beat signal that has been extracted will be referred to as an "extracted beat signal".

In step S182, the velocity calculation unit 253 performs the Doppler FFT on the extracted beat signal. The Doppler FFT is an FFT to obtain Doppler (velocity) by performing the FFT on the beat signal in the waveform direction. By the Doppler FFT, a phase change per chirp can be found out, and the velocity can be obtained. That is, if there is a relative velocity, the beat signal shifts gradually, so that this shift is observed by the Doppler FFT as a phase change of a sine wave.

Then, the velocity calculation unit 253 calculates power for each Doppler bin for the data obtained by the Doppler FFT so as to generate a power spectrum of Doppler bins.

Figure 21:
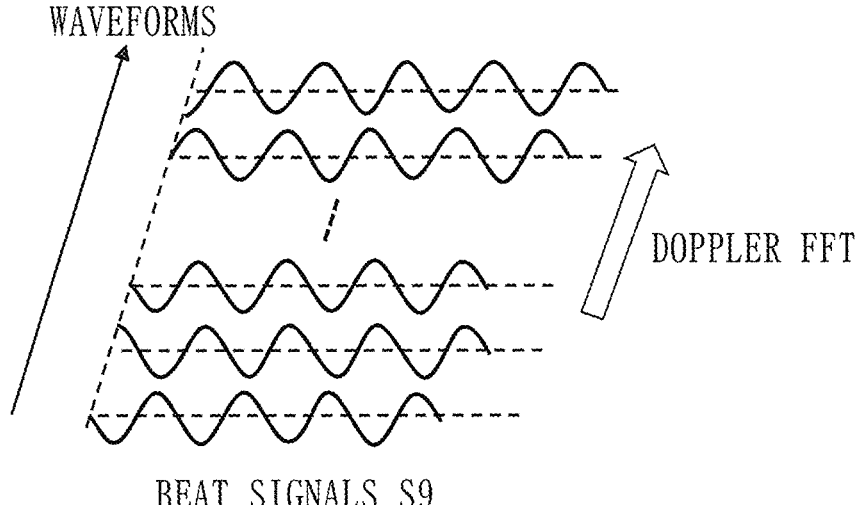
FIG. 21 is a schematic diagram of the beat signals S9 in Embodiment 1.

FIG. 21 illustrates a schematic diagram of the beat signals S9.

The beat signals S9 include beat signals of different waveforms and have a certain time length.

The velocity calculation unit 253 extracts a beat signal of one sample time period from the beat signals S9 at a time (S181), and performs the Doppler FFT on the beat signal of one sample time period at a time (S182).

Referring back to FIG. 20, the description will be continued from step S183.

In step S183, the velocity calculation unit 253 compares the power spectra of two consecutive time periods to calculate a difference between the power spectra of the two consecutive time periods, and stores the calculated difference. By this, peaks caused by an attack with a rapidly changing velocity over time can be distinguished from peaks of a detection target whose velocity does not change greatly.

Specifically, the velocity calculation unit 253 calculates a difference between the power spectrum just generated in step S182 and the power spectrum generated the previous time in step S182.

Note that since there is no power spectrum for comparison in step S183 in the first loop, it is not necessary to execute step S183 in the first loop.

Figure 22:
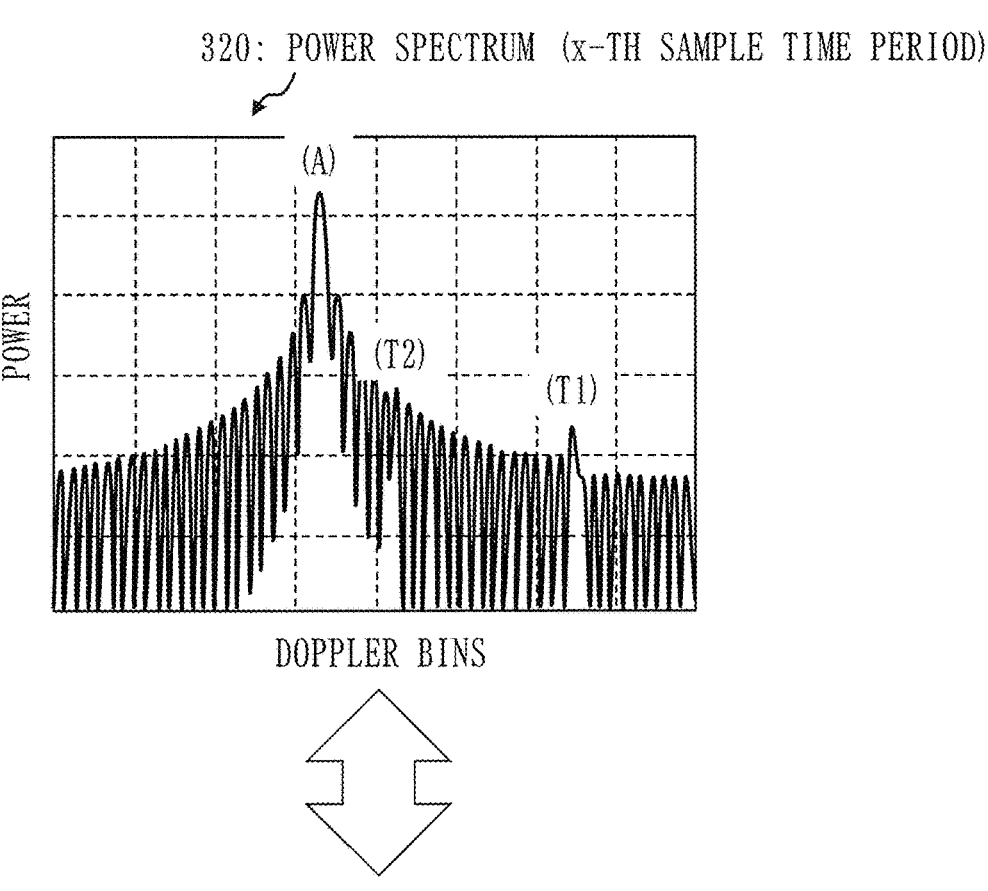
FIG. 22 is a diagram illustrating two power spectra 320 in Embodiment 1.
Figure 22:
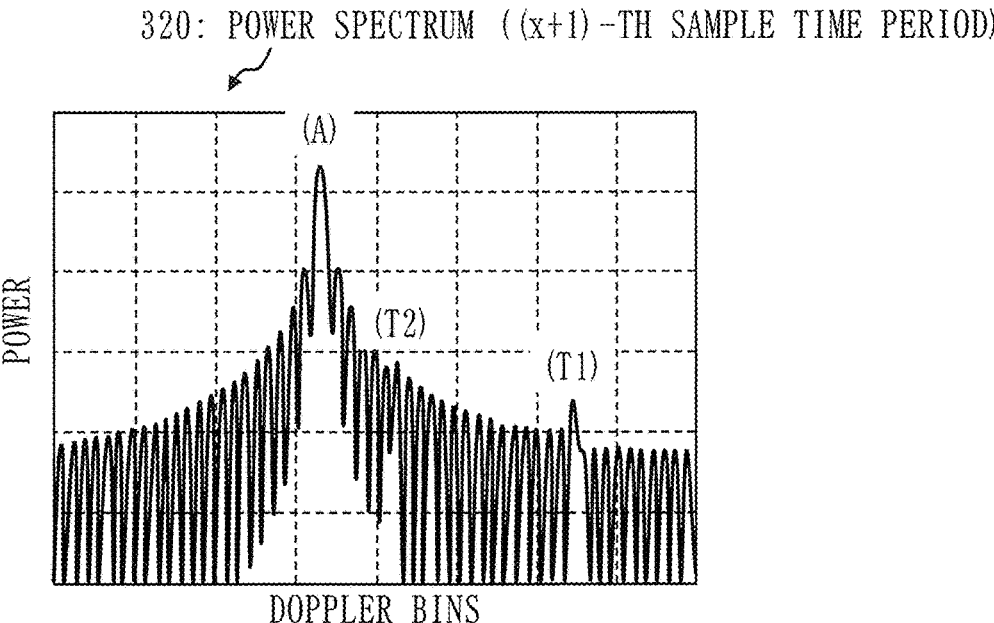

FIG. 22 illustrates a power spectrum 320 of an x-th sample time period and a power spectrum 320 of an (x+1)-th sample time period. These two power spectra 320 are a specific example of the power spectra of Doppler bins of two consecutive time periods.

The power spectrum 320 indicates the power of each Doppler bin. The local peak (A) is a local peak corresponding to cover chirp jamming, and the local peaks (T1) and (T2) are local peaks corresponding to the target objects.

The situation represented by each of the power spectra 320 is the same as the situation represented by the RD map 300 (see FIGS. 8 and 9). That is, there are two target objects, and cover chirp jamming is being carried out on one of the target objects. The power of cover chirp jamming is dominant, and the local peak (T2) corresponding to one of the target objects is buried.

The velocity calculation unit 253 compares the two power spectra 320 to calculate a difference.

Figure 23:
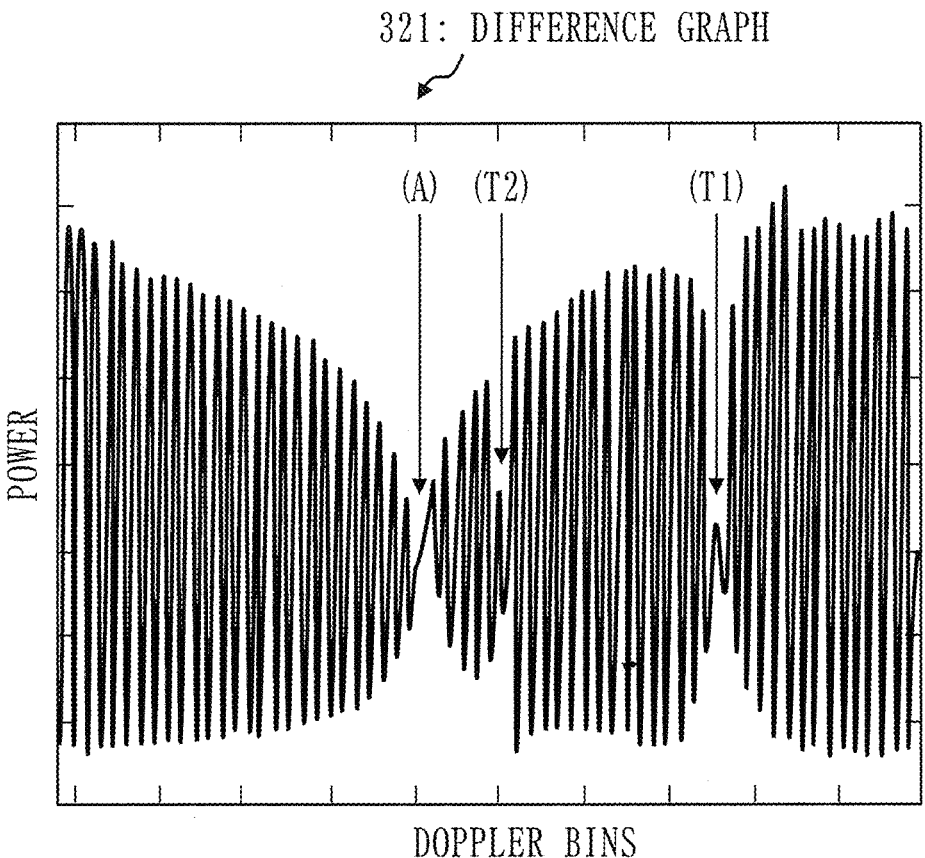
FIG. 23 is a diagram illustrating a difference graph 321 in Embodiment 1.

FIG. 23 illustrates a difference graph 321. The difference graph 321 indicates the difference between the power spectrum 320 of the x-th sample time period and the power spectrum 320 of the (x+1)-th sample time period.

In the difference graph 321, the power of Doppler bins corresponding to the local peaks of the two power spectra 320 is small.

Each of power (T1) and power (T2) is a difference in power of the local peaks corresponding to the target object, and the Doppler bin corresponding to each of the power (T1) and the power (T2) does not change between any two consecutive time periods.

Power (A) is a difference in power of local peaks corresponding to cover chirp jamming, and the Doppler bin corresponding to the power (a) changes depending on two consecutive time periods. This is because the frequency is gradually shifted in cover chirp jamming.

Referring back to FIG. 20, the description will be continued from step S184.

In step S184, the velocity calculation unit 253 determines whether there is a beat signal of a time period that has not been selected.

If there is a beat signal of a time period that has not been selected, processing proceeds to step S181.

If there is no beat signal of a time period that has not been selected, processing proceeds to step S185.

In step S185, the velocity calculation unit 253 calculates variation in differences for each Doppler bin with respect to the differences stored in step S183.

Specifically, the velocity calculation unit 253 calculates the standard deviation or variance of the differences for each Doppler bin.

In step S186, the velocity calculation unit 253 generates a difference statistic graph based on the variation of each Doppler bin.

The difference statistic graph is a graph that indicates statistics of differences between Doppler bins. Specific examples of the statistics are the standard deviation, smoothed standard deviation, variance, and smoothed variance.

Specifically, the velocity calculation unit 253 performs smoothing processing on the variation of each Doppler bin. A specific example of smoothing processing is processing to obtain the moving average (moving average processing). Then, the velocity calculation unit 253 generates a graph that indicates the smoothed variation of each Doppler bin. The generated graph is a difference statistic graph.

In step S187, the velocity calculation unit 253 identifies a peak in the difference statistic graph. At this time, in order to detect the target object, which has a small change in Doppler bin, the velocity calculation unit 253 identifies a negative peak.

Next, the velocity calculation unit 253 identifies the Doppler bin corresponding to the peak.

Then, the velocity calculation unit 253 calculates the relative velocity of the target object based on the Doppler bin number corresponding to the peak.

Figure 24:
FIG. 24 is a diagram illustrating a difference statistic graph 322 in Embodiment 1.
Figure 24:
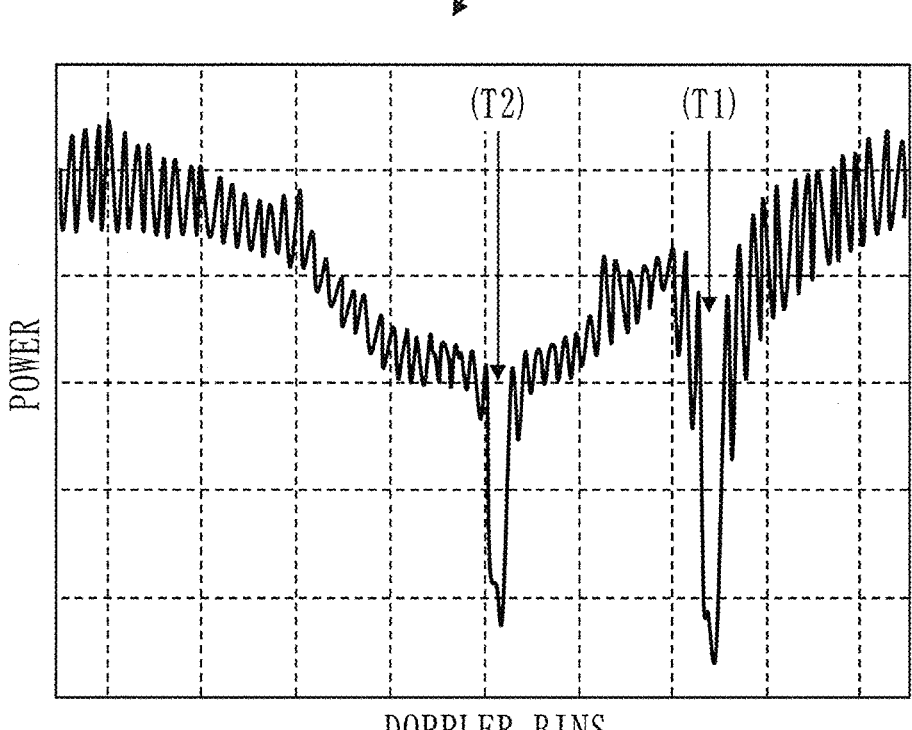

FIG. 24 illustrates a difference statistic graph 322. The difference statistic graph 322 indicates the moving average of the standard deviation of each Doppler bin.

By using the difference statistic graph 322, it is possible to ignore a sudden phase shift of cover chirp jamming, and focus attention on gradual phase changes so as to identify the Doppler bin numbers corresponding to the target objects (T1) and (T2).

*Description of Implementation Examples*

In the distance calculation process (S170 of FIG. 14), step S175 to step S177 may be the process as described below.

The distance calculation unit 252 calculates, for each range bin, variation in the number of times each range bin has been identified as the range bin corresponding to a peak. Specific examples of variation are the variance, standard deviation, and the like.

Next, the distance calculation unit 252 performs processing to obtain the CFAR for the variation of each range bin.

Then, the distance calculation unit 252 identifies a range bin whose change is smaller than a threshold value in the data obtained by this processing, and calculates the relative distance based on the range bin number of the identified range bin.

CFAR is an abbreviation for constant false alarm rate.

In the distance calculation process (S170 of FIG. 14), step S171 to step S174 may be the process as described below.

The distance calculation unit 252 performs the Doppler FFT on the beat signals S9. Then, the distance calculation unit 252 performs, for each Doppler bin, the range FFT on the data obtained by the Doppler FFT so as to generate a power spectrum of range bins for each Doppler bin.

That is, the process in step S172 and the subsequent steps may be applied to the RD map.

In the velocity calculation process (S180 of FIG. 20), step S185 to step S187 may be the process as described below.

The velocity calculation unit 253 calculates the sum or arithmetic mean of differences for each Doppler bin.

Next, the velocity calculation unit 253 performs processing to obtain the CFAR for the sum for each Doppler bin or obtain the arithmetic mean for each Doppler bin.

Then, the velocity calculation unit 253 identifies a Doppler bin whose change in the data obtained by this processing is smaller than a threshold value, and calculates the relative velocity based on the Doppler bin number of the identified Doppler bin.

In the velocity calculation process (S180 of FIG. 20), step S181 to step S184 may be the process as described below.

The velocity calculation unit 253 performs the range FFT on the beat signals S9. Then, the velocity calculation unit 253 performs the Doppler FFT on the data obtained by the range FFT for each range bin so as to generate a power spectrum of Doppler bins for each range bin.

That is, the process of step S182 and the subsequent steps may be applied to the RD map.

The process of the distance calculation unit 252 and the process of the velocity calculation unit 253 may be interchanged.

That is, the distance calculation process (S170 of FIG. 14) may be implemented as the velocity calculation process by replacing one waveform with one sample time period, the range FFT with the Doppler FFT, and range bins with Doppler bins.

The velocity calculation process (S180 of FIG. 20) may be implemented as the distance calculation process by replacing one sample time period with one waveform, the Doppler FFT with the range FFT, time periods with waveforms, and Doppler bins with range bins.

In that case, the distance calculation unit 252 generates a power spectrum of range bins for each time period or for each Doppler bin using the beat signals S9, generates a difference statistic graph that indicates statistics of differences between power spectra, and calculates the distance based on the range bin number corresponding to a peak in the difference statistic graph as the relative distance of the target object.

Specifically, the distance calculation unit 252 extracts a beat signal of each time period from the beat signals S9 and performs the Fourier transform on the beat signal of each time period to generate a power spectrum for each time period, compares power spectra to calculate a difference in the power of each range bin for each combination of two consecutive time periods, and generates a difference statistic graph based on the calculated difference.

Specifically, the distance calculation unit 252 generates a power spectrum for each Doppler bin using a Doppler-range map obtained by performing the Fourier transform on the beat signals S9, compares power spectra to calculate a difference in the power of each range bin for each combination of two consecutive Doppler bins, and generates a difference statistic graph based on the calculated differences.

Specifically, the distance calculation unit 252 calculates the standard deviation of differences or the variance of differences for each range bin, and performs smoothing processing on the standard deviation of each range bin or the variance of each range bin to generate a difference statistic graph.

The velocity calculation unit 253 generates a histogram of Doppler bins using the beat signals S9, and calculates the velocity based on the Doppler bin number corresponding to a peak in the histogram as the relative velocity of the target object.

Specifically, the velocity calculation unit 253 performs the Fourier transform on the beat signal to generate a power spectrum of Doppler bins for each waveform, identifies the Doppler bin corresponding to a peak in the power spectrum for each waveform, and generates a histogram based on the number of times each Doppler bin has been identified.

Specifically, the velocity calculation unit 253 generates a power spectrum of Doppler bins for each range bin using a Doppler-range map obtained by performing the Fourier transform on the beat signals S9, identifies the Doppler bin corresponding to a peak in the power spectrum for each range bin, and generates a histogram based on the number of times each Doppler bin has been identified.

Specifically, the velocity calculation unit 253 calculates, for each Doppler bin, the number of times the Doppler bin has been identified so as to generate a provisional histogram of Doppler bins, and performs smoothing processing on the provisional histogram to generate a histogram.

The radar device 100 may be MIMO radar.

In that case, the radar device 100 includes a plurality of transmission antennas 113 and a plurality of reception antennas 114. The radar device 100 includes the same number of low-pass filters 116 and the same number of ADCs 117 as the number of the reception antennas 114.

MIMO is an abbreviation for multi-input multi-output.

A configuration of the radar device 100 may be a configuration without one of the distance calculation unit 252 and the velocity calculation unit 253.

Effects of Embodiment 1

The radar device 100 has the following effects by devising signal processing that extracts information from the beat signals S9 in the framework of the conventional FMCW method.

The attack determination unit 251 makes an attack determination based on the beat signals S9, which are the beat signals S8 in frame units, so as to obtain the attack determination result S10.

Then, depending on the attack determination result S10, the information calculation unit 240 operates or the distance calculation unit 252 and the velocity calculation unit 253 operate.

As a result, the relative distance of the target object and the relative velocity of the target object can be obtained.

The attack determination unit 251 can detect cover chirp jamming by utilizing the fact that cover chirp jamming generates power in a relatively large area on the RD map.

Furthermore, even if the power of the target object is buried in noise of strong power due to cover chirp jamming, the distance calculation unit 252 can calculate the relative distance of the target object and the velocity calculation unit 253 can calculate the relative velocity of the target object.

Embodiment 2

With regard to variations of the radar device 100, differences from Embodiment 1 will be mainly described based on FIGS. 25 to 28.

*Variation 1*

*Description of Configuration*

Figure 25:
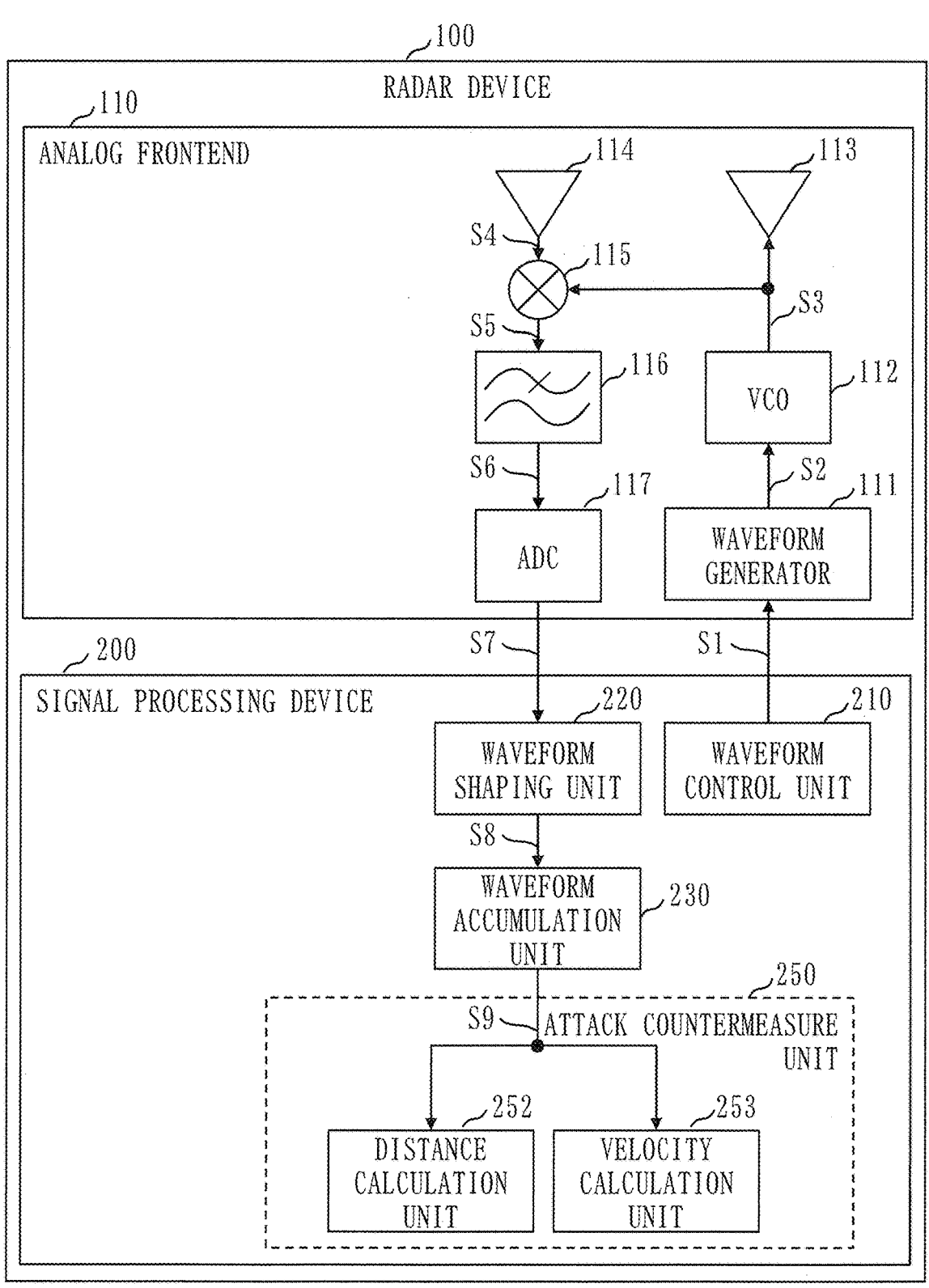
FIG. 25 is a configuration diagram of the radar device 100 in Embodiment 2 (Variation 1)

Based on FIG. 25, a configuration of the radar device 100 will be described.

The radar device 100 does not include the information calculation unit 240 and the attack determination unit 251 that are included in the configuration of Embodiment 1.

*Description of Operation*

Figure 26:
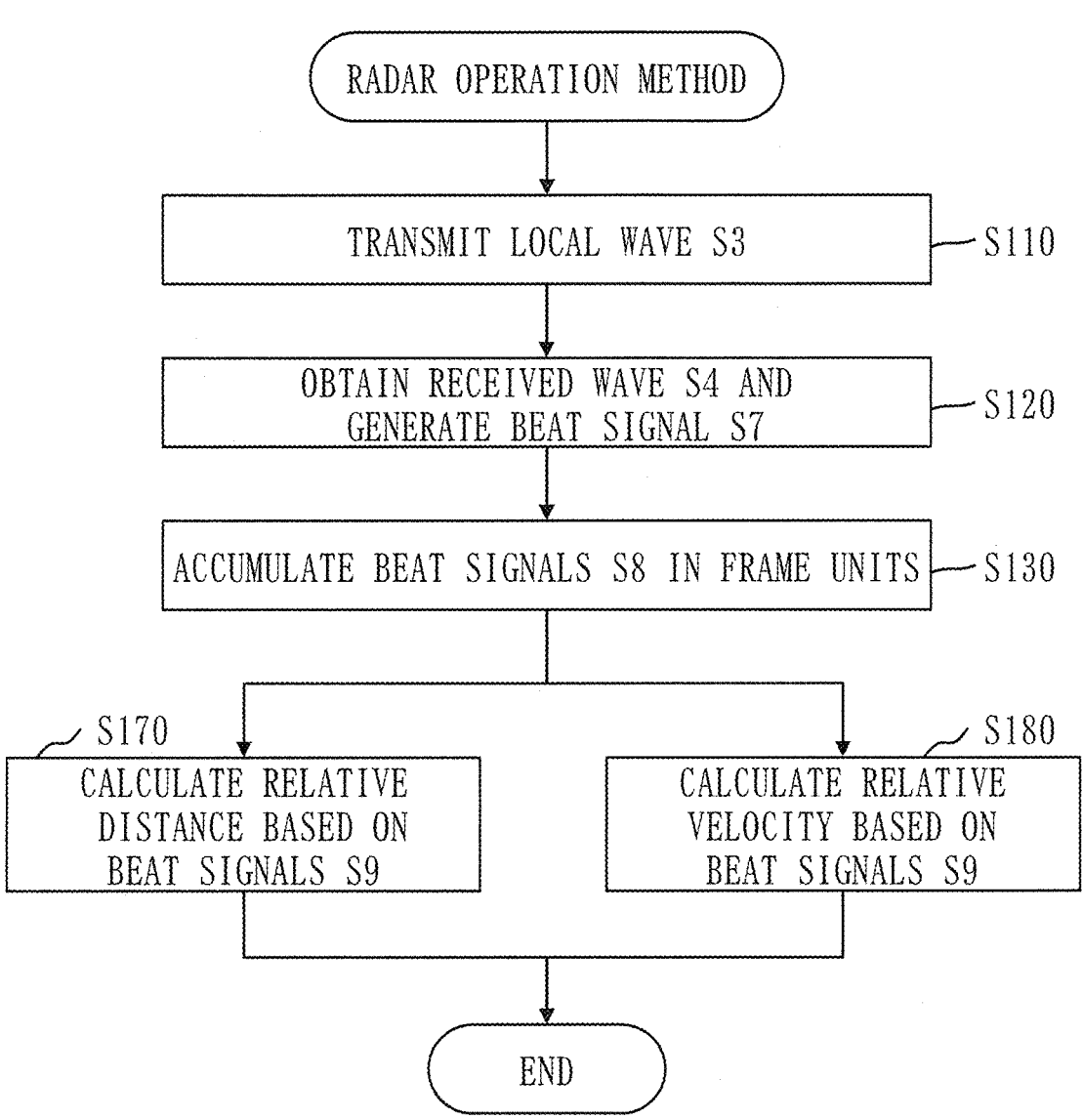
FIG. 26 is a flowchart of the radar operation method in Embodiment 2 (Variation 1)

Based on FIG. 26, the radar operation method will be described.

Step S110 to step S130 are as described in Embodiment 1.

After step S130, processing proceeds to step S170 and step S180.

In step S170, the distance calculation unit 252 calculates the relative distance of the target object based on the beat signals S9. Step S170 is as described in Embodiment 1.

In step S180, the velocity calculation unit 253 calculates the relative velocity of the target object based on the beat signals S9. Step S180 is as described in Embodiment 1.

*Effects of Variation 1*

The radar device 100 can calculate the relative distance of the target object and the relative velocity of the target object with a smaller configuration.

*Supplement to Variation 1*

A configuration of the radar device 100 may be a configuration without one of the distance calculation unit 252 and the velocity calculation unit 253.

*Variation 2*

*Description of Configuration*

Figure 27:
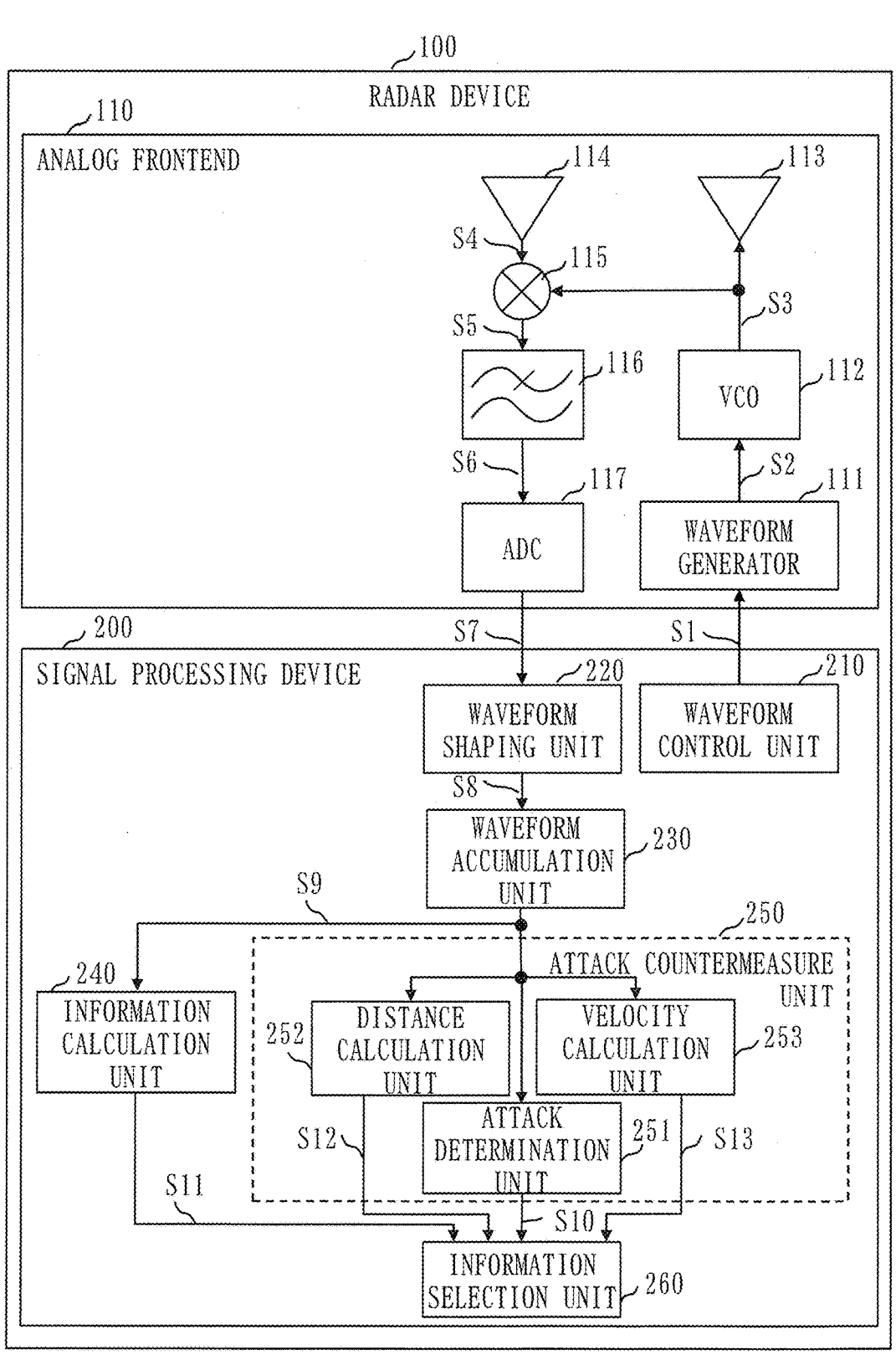
FIG. 27 is a configuration diagram of the radar device 100 in Embodiment 2 (Variation 2)

Based on FIG. 27, a configuration of the radar device 100 will be described.

The radar device 100 includes an information selection unit 260 in addition to the configuration of Embodiment 1.

*Description of Operation*

Figure 28:
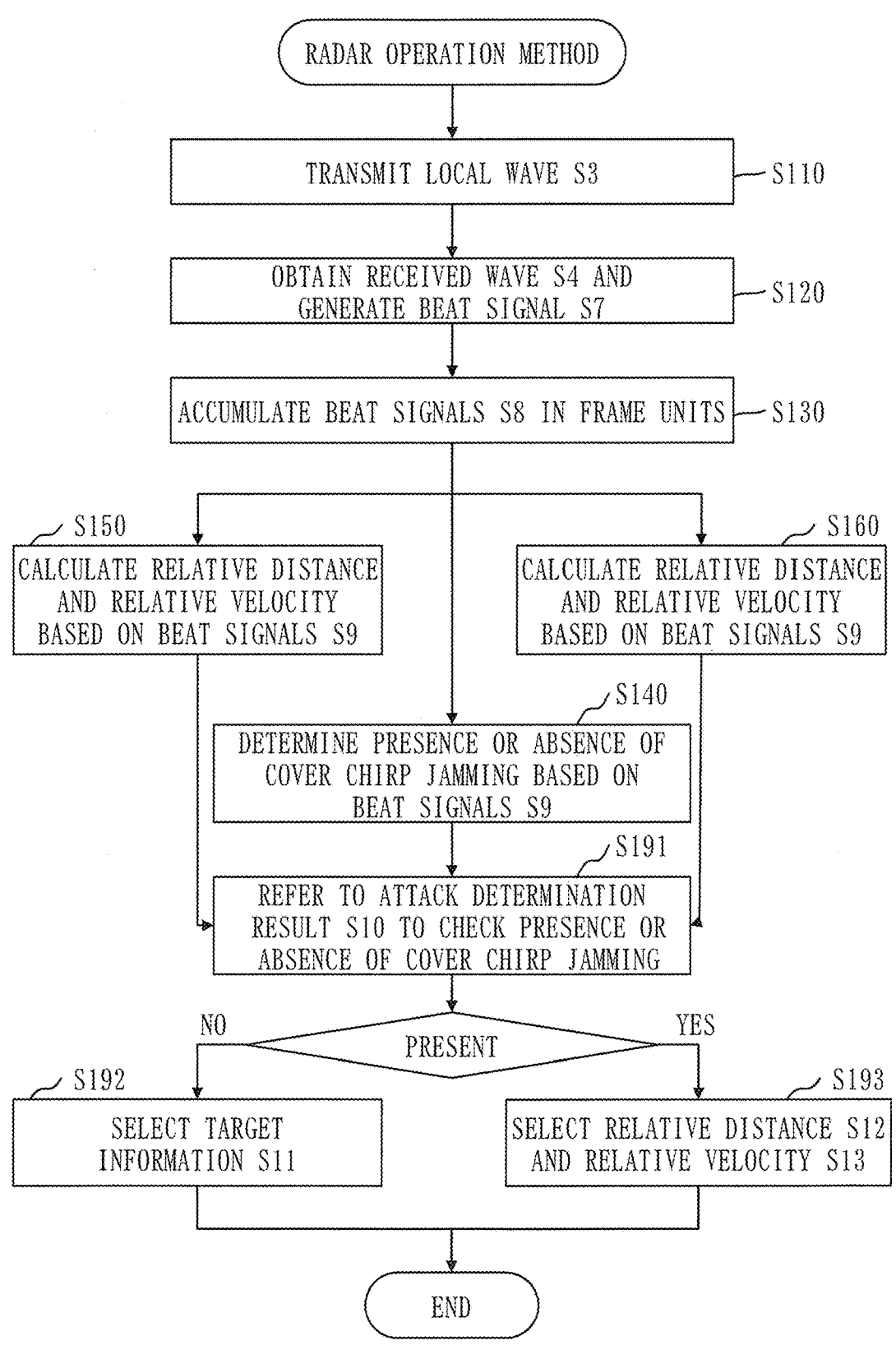
FIG. 28 is a flowchart of the radar operation method in Embodiment 2 (Variation 2)

Based on FIG. 28, the radar operation method will be described.

Step S110 to step S130 are as described in Embodiment 1.

After step S130, processing proceeds to step S140, step S150, and step S160.

In step S140, the attack determination unit 251 determines the presence or absence of cover chirp jamming based on the beat signals S9. Step S140 is as described in Embodiment 1.

In step S150, the information calculation unit 240 calculates the relative distance of the target object and the relative velocity of the target object based on the beat signals S9. Step S150 is as described in Embodiment 1.

The relative distance and relative velocity calculated in step S150 will be referred to as target information S11.

In step S160, the distance calculation unit 252 calculates the relative distance of the target object based on the beat signals S9, and the velocity calculation unit 253 calculates the relative velocity of the target object based on the beat signals S9. Step S160 is as described in Embodiment 1.

The relative distance calculated in step S160 will be referred to as a relative distance S12, and the relative velocity calculated in step S160 will be referred to as a relative velocity S13.

After step S140, step S150, and step S160, processing proceeds to step S191.

In step S191, the information selection unit 260 refers to the attack determination result S10 to check the presence or absence of cover chirp jamming.

If cover chirp jamming is not present, processing proceeds to step S192.

If cover chirp jamming is present, processing proceeds to step S193.

In step S192, the information selection unit 260 selects and outputs the target information S11.

In step S193, the information selection unit 260 selects and outputs the relative distance S12 and the relative velocity S13.

*Effects of Variation 2*

As in Embodiment 1, the radar device 100 can calculate the relative distance of the target object and the relative velocity of the target object.

*Supplement to Embodiments*

Figure 29:
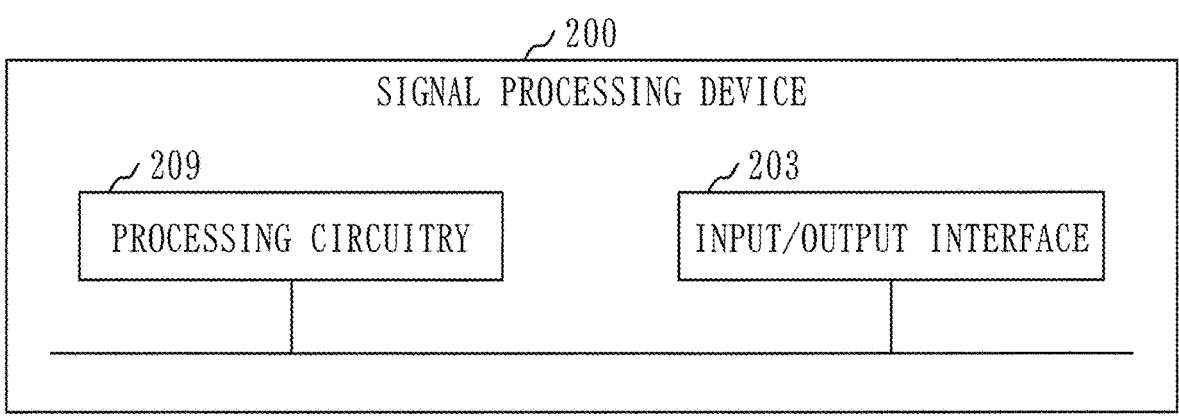
FIG. 29 is a hardware configuration diagram of the signal processing device 200 in the embodiments.

Based on FIG. 29, a hardware configuration of the signal processing device 200 will be described.

The signal processing device 200 includes processing circuitry 209.

The processing circuitry 209 is hardware that realizes the waveform control unit 210, the waveform shaping unit 220, the waveform accumulation unit 230, the information calculation unit 240, the attack countermeasure unit 250, and the information selection unit 260.

The processing circuitry 209 may be dedicated hardware, or may be the processor 201 that executes programs stored in the memory 202.

When the processing circuitry 209 is dedicated hardware, the processing circuitry 209 is, for example, a single circuit, a composite circuit, a programmed processor, a parallel-programmed processor, an ASIC, an FPGA, or a combination of these.

ASIC is an abbreviation for application specific integrated circuit.

FPGA is an abbreviation for field programmable gate array.

The signal processing device 200 may include a plurality of processing circuits as an alternative to the processing circuitry 209.

In the processing circuitry 209, some functions may be realized by dedicated hardware, and the remaining functions may be realized by software or firmware.

As described above, the functions of the signal processing device 200 can be realized by hardware, software, firmware, or a combination of these.

Each of the embodiments is an example of a preferred embodiment and is not intended to limit the technical scope of the present disclosure. Each of the embodiments may be implemented partially or may be implemented in combination with another embodiment. The procedures described using the flowcharts or the like may be changed as appropriate.

Each "unit" that is an element of the signal processing device 200 may be interpreted as "process", "step", "circuit", or "circuitry".

REFERENCE SIGNS LIST

100: radar device, 110: analog frontend, 111: waveform generator, 112: VCO, 113: transmission antenna, 114: reception antenna, 115: mixer, 116: low-pass filter, 117: ADC, 200: signal processing device, 201: processor, 202: memory, 203: input/output interface, 209: processing circuitry, 210: waveform control unit, 220: waveform shaping unit, 230: waveform accumulation unit, 240: information calculation unit, 250: attack countermeasure unit, 251: attack determination unit, 252: distance calculation unit, 253: velocity calculation unit, 260: information selection unit, 300: RD map, 301: scanning window, 302: median processing result, 310: power spectrum, 311: range peak graph, 312: histogram, 320: power spectrum, 321: difference graph, 322: difference statistic graph, S1: control signal, S2: ramp signal, S3: local wave, S4: received wave, S5: mixing signal, S6: filtered signal, S7: beat signal, S8: beat signal, S9: beat signal, S10: attack determination result, S11: target information, S12: relative distance, S13: relative velocity.

The invention claimed is:

1. A signal processing device comprising processing circuitry to:

accumulate beat signals in frame units, the beat signals being digital signals obtained from a mixing signal obtained by performing mixing of a local wave that is transmitted to detect a target object and a received wave that is received as a reflected wave corresponding to the local wave;

generate a histogram of range bins using the beat signals in frame units, and calculate a distance based on a range bin number corresponding to a peak in the histogram as a relative distance of the target object; and generate a power spectrum of Doppler bins for each time period or for each range bin using the beat signals in frame units, generate a difference statistic graph that indicates a statistic of differences between power spectra, and calculate a velocity based on a Doppler bin number corresponding to a peak in the difference statistic graph as a relative velocity of the target object.

2. The signal processing device according to claim 1, wherein the beat signals in frame units include beat signals with different waveforms, and wherein the processing circuitry performs a Fourier transform on a beat signal to generate a power spectrum of range bins for each waveform, identifies a range bin corresponding to a peak in the power spectrum for each waveform, and generates the histogram based on the number of times each range bin has been identified.

3. The signal processing device according to claim 2, wherein the processing circuitry calculates, for each range bin, the number of times each range bin has been identified so as to generate a provisional histogram of range bins, and performs smoothing processing on the provisional histogram to generate the histogram.

4. The signal processing device according to claim 1, wherein the processing circuitry generates a power spectrum of range bins for each Doppler bin using a Range-Doppler map obtained by performing a Fourier transform on the beat signals in frame units, identifies a range bin corresponding to a peak in the power spectrum for each Doppler bin, and generates the histogram based on the number of times each range bin has been identified.

5. The signal processing device according to claim 4, wherein the processing circuitry calculates, for each range bin, the number of times each range bin has been identified so as to generate a provisional histogram of range bins, and performs smoothing processing on the provisional histogram to generate the histogram.

6. The signal processing device according to claim 1, wherein the processing circuitry extracts a beat signal of each time period from the beat signals in frame units, performs a Fourier transform on the beat signal of each time period to generate the power spectrum for each time period, compares power spectra to calculate a difference in power of each Doppler bin for each combination of two consecutive time periods, and generates the difference statistic graph based on the calculated differences.

7. The signal processing device according to claim 6, wherein the processing circuitry calculates a standard deviation of the difference or variance of the difference for each Doppler bin, and performs smoothing processing on the standard deviation of each Doppler bin or the variance of each Doppler bin to generate the difference statistic graph.

8. The signal processing device according to claim 1, wherein the processing circuitry generates the power spectrum for each range bin using a Range-Doppler map obtained by performing a Fourier transform on the beat signals in frame units, compares power spectra to calculate a difference in power of each Doppler bin for each combination of two consecutive range bins, and generates the difference statistic graph based on the calculated differences.

9. The signal processing device according to claim 8, wherein the processing circuitry calculates a standard deviation of the difference or variance of the difference for each Doppler bin, and performs smoothing processing on the standard deviation of each Doppler bin or the variance of each Doppler bin to generate the difference statistic graph.

10. The signal processing device according to claim 1, wherein the processing circuitry performs a Fourier transform on the beat signals in frame units to generate a Range-Doppler map, and determines presence or absence of cover chirp jamming based on the Range-Doppler map.

11. The signal processing device according to claim 10, wherein the processing circuitry performs smoothing processing for each area in the Range-Doppler map to calculate a representative value for each area in the Range-Doppler map, and determines the presence or absence of cover chirp jamming based on the representative value of each area.

12. The signal processing device according to claim 10, wherein the processing circuitry performs a Fourier transform on the beat signals in frame units to calculate a relative distance of the target object and a relative velocity of the target object.

13. The signal processing device according to claim 12, wherein when the presence of cover chirp jamming is determined, the processing circuitry calculates the relative distance by generating the histogram, wherein when the presence of cover chirp jamming is determined, the processing circuitry calculates the relative velocity by generating the power spectrum, and wherein when the absence of cover chirp jamming is determined, the processing circuitry calculates the relative distance and the relative velocity by performing the Fourier transform.

14. The signal processing device according to claim 12, wherein when the presence of cover chirp jamming is determined, the processing circuitry selects the relative distance calculated by generating the histogram, and selects the relative velocity calculated by generating the power spectrum, and when the absence of cover chirp jamming is determined, the processing circuitry selects the relative distance and the relative velocity calculated by performing the Fourier transform.

15. A radar device comprising:

an analog frontend to transmit a local wave, receive a reflected wave corresponding to the local wave as a received wave, perform mixing of the local wave and the received wave to generate a mixing signal, and generate a beat signal that is a digital signal corresponding to the mixing signal; and the signal processing device according to claim 1.

16. A radar operation method comprising:

accumulating beat signals in frame units, the beat signals being digital signals obtained from a mixing signal obtained by performing mixing of a local wave that is transmitted to detect a target object and a received wave that is received as a reflected wave corresponding to the local wave;

generating a histogram of range bins using the beat signals in frame units, and calculating a distance based on a range bin number corresponding to a peak in the histogram as a relative distance of the target object; and generating a power spectrum of Doppler bins for each time period or for each range bin using the beat signals in frame units, generating a difference statistic graph that indicates a statistic of differences between power spectra, and calculating a velocity based on a Doppler bin number corresponding to a peak in the difference statistic graph as a relative velocity of the target object.

\* \* \* \* \*